US012558801B2

(12) United States Patent
Shannon et al.

(10) Patent No.: US 12,558,801 B2
(45) Date of Patent: Feb. 24, 2026

(54) ROBOTIC TORSO

(71) Applicant: Sanctuary Cognitive Systems Corporation, Vancouver (CA)

(72) Inventors: Connor Richard Shannon, Vancouver (CA); Hessam Maleki, Burnaby (CA); James Zhong Sheng Liu, Burnaby (CA); Matthew Hill, Vancouver (CA); Seymur Dadashov, Richmond (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 70 days.

(21) Appl. No.: 18/395,746

(22) Filed: Dec. 26, 2023

(65) Prior Publication Data

US 2024/0208082 A1     Jun. 27, 2024

Related U.S. Application Data

(60) Provisional application No. 63/435,302, filed on Dec. 26, 2022.

(51) Int. Cl.
B25J 17/00 (2006.01)
(52) U.S. Cl.
CPC ................................... B25J 17/00 (2013.01)
(58) Field of Classification Search
CPC ........ B25J 17/00; B25J 17/025; B25J 9/0087; B25J 9/065; B25J 9/08; B62D 57/032
See application file for complete search history.

(56) References Cited

U.S. PATENT DOCUMENTS

| | | | | |
|---|---|---|---|---|
| 5,428,713 A | * | 6/1995 | Matsumaru | B25J 9/1615 |
| | | | | 700/262 |
| 6,463,356 B1 | * | 10/2002 | Hattori | B62D 57/032 |
| | | | | 701/25 |
| 6,564,888 B1 | * | 5/2003 | Gomi | B62D 57/032 |
| | | | | 901/1 |
| 6,658,962 B1 | * | 12/2003 | Rosheim | B25J 17/0275 |
| | | | | 901/26 |
| 6,917,175 B2 | * | 7/2005 | Hattori | B62D 57/032 |
| | | | | 446/175 |
| 7,023,164 B2 | * | 4/2006 | Iribe | B25J 9/1674 |
| | | | | 388/903 |

(Continued)

FOREIGN PATENT DOCUMENTS

| | | | | |
|---|---|---|---|---|
| KR | 100788787 B1 | * | 12/2007 | |
| KR | 20100014038 A | * | 2/2010 | |

OTHER PUBLICATIONS

KR-100788787-B1 Machine Translation (Year: 2007).*

*Primary Examiner* — Jake Cook
(74) *Attorney, Agent, or Firm* — Adenike Adebiyi; Thomas Mahon

(57) ABSTRACT

A robotic torso for a humanoid robot includes a first torso member having an axial axis aligned with a reference axis and a second torso member having at least one mounting portion for at least one humanoid component. The robotic torso includes a series of actuators arranged in a column between the first torso member and the second torso member and coupling the first torso member to the second torso member. Each of the actuators has a rotatable member defining a rotational axis. The rotational axes of each adjacent pair of actuators in the series of actuators are orthogonal to each other.

8 Claims, 30 Drawing Sheets

(56) References Cited

U.S. PATENT DOCUMENTS

| | | | | |
|---|---|---|---|---|
| 7,597,025 B2 * | 10/2009 | Narita | ................. | B25J 19/0029 |
| | | | | 901/23 |
| 7,971,504 B2 * | 7/2011 | Haniya | ............... | B25J 19/0029 |
| | | | | 74/490.03 |
| 8,875,594 B2 * | 11/2014 | Alfayad | .............. | B62D 57/032 |
| | | | | 901/18 |
| 2003/0038607 A1 * | 2/2003 | Yim | ........................ | B25J 9/08 |
| | | | | 318/568.11 |
| 2014/0137691 A1 * | 5/2014 | Nogami | ................ | B25J 17/025 |
| | | | | 901/29 |

* cited by examiner

ROBOTIC TORSO

CROSS-REFERENCE TO RELATED APPLICATIONS

This application claims the benefit of U.S. Provisional Application No. 63/435,302 filed Dec. 26, 2022, the content of which is incorporated herein by reference.

FIELD

The field generally relates to robotic structures and particularly to humanoid robotic structures.

BACKGROUND

Robots are machines that can sense their environments and perform tasks autonomously. A humanoid robot is a robot or machine having an appearance and/or character resembling that of a human. Humanoid robots can be designed to function as team members with humans in diverse applications, such as construction, manufacturing, monitoring, exploration, learning, and entertainment. Humanoid robots can be particularly advantageous in substituting for humans in environments that may be dangerous to humans or uninhabitable by humans.

There continues to be a need for a robot that can be easily integrated into diverse environments to assist or substitute for humans.

SUMMARY

In a representative example, a robotic torso includes a torso base having an axial axis aligned with a reference axis and a torso column coupled to the torso base and rotatable relative to the torso base about the reference axis. The torso column includes a series of torso segments coupled together by a series of movable joints including at least a first movable joint and a second movable joint. The first movable joint is controllable to bend the torso column about a first axis that is nonparallel to the reference axis. The second movable joint is controllable to bend the torso column about a second axis that is nonparallel to the reference axis and nonparallel to the first axis.

In a representative example, a robot includes a robotic torso including a torso base having an axial axis aligned with a reference axis and a torso column coupled to the torso base and rotatable relative to the torso base about the reference axis. The torso column includes a series of torso segments coupled together by a series of movable joints including at least a first movable joint and a second movable joint. The first movable joint is controllable to bend the torso column about a first axis that is nonparallel to the reference axis. The second movable joint is controllable to bend the torso column about a second axis that is nonparallel to the reference axis and nonparallel to the first axis. The robot includes a first robotic arm coupled to one of the torso segments of the series of torso segments.

In a representative example, a robotic torso includes a torso base having an axial axis aligned with a reference axis and a torso column coupled to the torso base and rotatable relative to the torso base about the reference axis. The torso column includes a series of torso segments coupled together by a series of movable joints. Each of the movable joints has one or more degrees of freedom and is controllable to define a spatial pose of the torso column in a three-dimensional space. A first pair of the torso segments are coupled together by a first movable joint that is controllable to cause relative rotation between the first pair of the torso segments about a first axis that is nonparallel to the reference axis. A second pair of the torso segments are coupled together by a second movable joint that is controllable to cause relative rotation between the second pair of torso segments about a second axis that is nonparallel to the reference axis and nonparallel to the first axis.

In a representative example, a robot includes a torso base having an axial axis aligned with a reference axis and a torso column coupled to the torso base and rotatable relative to the torso base about the reference axis. The torso column includes a series of torso segments coupled together by a series of movable joints. Each of the movable joints has one or more degrees of freedom and is controllable to define a spatial pose of the torso column in a three-dimensional space. A first pair of the torso segments are coupled together by a first movable joint that is controllable to cause relative rotation between the first pair of the torso segments about a first axis that is nonparallel to the reference axis. A second pair of the torso segments are coupled together by a second movable joint that is controllable to cause relative rotation between the second pair of the torso segments about a second axis that is nonparallel to the reference axis and nonparallel to the first axis. The robot includes two robotic arms disposed on opposite sides of the reference axis and coupled to one of the torso segments.

In a representative example, a robotic torso includes a first torso member having an axial axis aligned with a reference axis and a second torso member having at least one mounting portion for at least one humanoid component joint. The robotic torso includes a series of actuators arranged in a column between the first torso member and the second torso member and coupling the first torso member to the second torso member. Each of the actuators has a rotatable member defining a rotational axis. The rotational axes of each adjacent pair of the actuators are orthogonal to each other.

In a representative example, a robot includes a robotic torso including a first torso member having an axial axis aligned with a reference axis, a second torso member having at least one support for at least one humanoid component joint, and a series of actuators arranged in a column between the first torso member and the second torso member and coupling the first torso member to the second torso member. Each of the actuators has a rotatable member defining a rotational axis. The rotational axes of each adjacent pair of the actuators are orthogonal to each other. The robot includes a humanoid component coupled to the second torso member.

In a representative example, a robotic torso includes a torso base having an inner chamber and an axial axis and a first actuator mounted within the inner chamber. The first actuator includes a first rotatable member having a first rotational axis aligned with the axial axis. The robotic torso includes a first torso member having a first support portion and a first connection portion. The first support portion has a first longitudinal axis that is orthogonal to the axial axis. The first connection portion is coupled to the first rotatable member such that the first torso member is rotatable with the first rotatable member. The robotic torso includes a second actuator mounted on the first support portion. The second actuator includes a second rotatable member having a second rotational axis aligned with the first longitudinal axis. The robotic torso includes a second torso member having a second support portion and a second connection portion. The second support portion has a second longitudinal axis, and the second connection portion has a third longitudinal axis that is orthogonal to the second longitudinal axis. The second connection portion is coupled to the second rotatable member such that the second torso member is rotatable with the second rotatable member. The robotic torso includes a third actuator mounted on the second support portion. The third actuator includes a third rotatable member having a third rotational axis aligned with the second longitudinal axis.

BRIEF DESCRIPTION OF THE DRAWINGS

FIG. 2B illustrates an abduction-adduction movement of the robotic torso of

FIG. 2A.

DETAILED DESCRIPTION

General Considerations

Figure 1A:
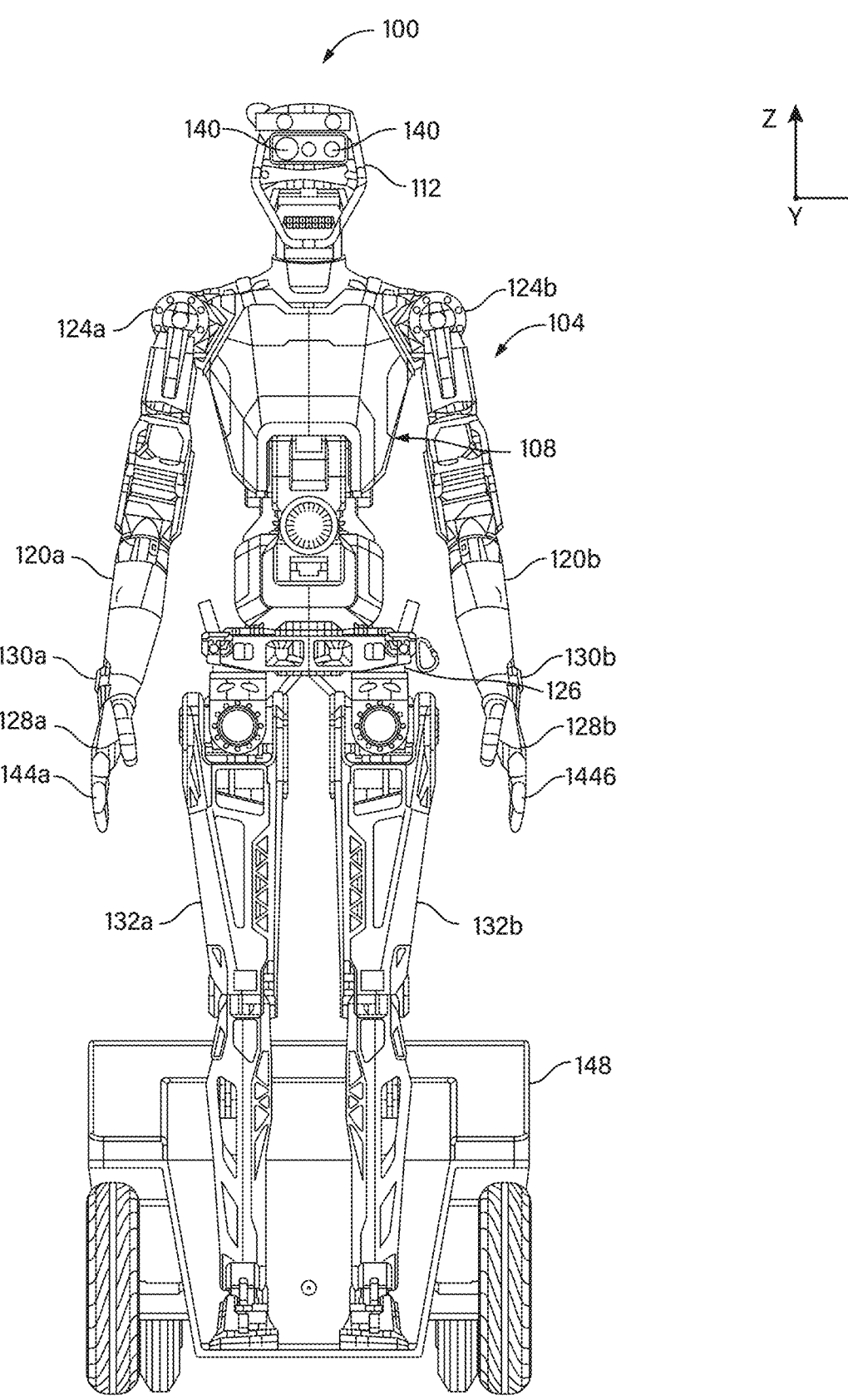
FIG. 1A is a front view of a mobile robot.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

Described herein is a robotic torso having multiple degrees of freedom (DOFs) configured to enable the robotic torso to have complex spatial poses in a three-dimensional space. Humanoid components, such as robotic head, robotic arms, and robotic legs, can be coupled to the robotic torso to form a humanoid robot. The robotic torso can allow the humanoid robot to complete difficult tasks that require bending and rotation of the torso in diverse environments.

Example II—Example Humanoid Robot

Figure 1B:
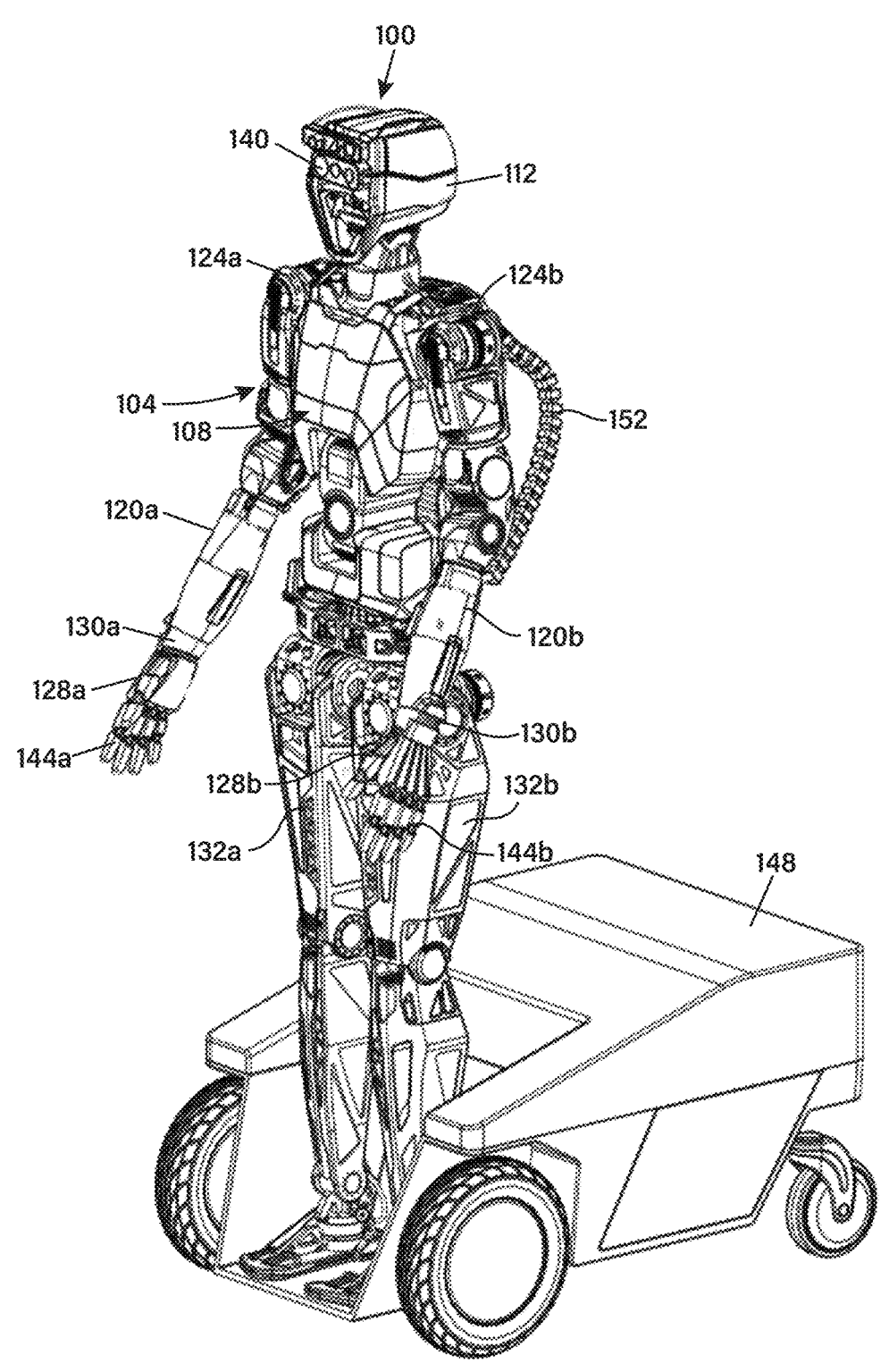
FIG. 1B is a perspective view of the mobile robot of FIG. 1A.

FIGS. 1A and 1B illustrate an exemplary robot 100 having a humanoid form. The robot 100 includes a robot body 104. The robot 100 can include one or more robotic legs (e.g., robotic legs 132a, 132b) coupled to the robot body 104. In some examples, the robotic legs 132a, 132b can be attached to a mobile base 148 (e.g., a wheeled base), which can be operated to move the robot 100 around. In other examples, the robotic legs 132a, 132b can be individually movable and provide the robot 100 with the desired mobility without the aid of a mobile base. In other examples, the robot may not have robotic legs, and the robot body can be mounted on a pedestal, which can be mounted on a mobile base.

The robot body 104 can include a robotic torso 108, a robotic head 112, robotic arms 120a, 120b, and robot hands 128a, 128b. The robotic head 112 can include one or more vision sensors 140, which the robot 100 can use to collect information from the environment of the robot 100. The robotic arms 120a, 120b are coupled to opposite sides of the torso 108 (e.g., via shoulder joints 124a, 124b). The robot hands 128a, 128b are coupled to the free ends of the arms 120a, 120b (e.g., via wrist joints 130a, 130b). The robot hands 128a, 128b (which can also be referred to as end effectors) can include one or more digits or articulable members 144a, 144b, which the robot 100 can use to interact with objects (e.g., touch or grasp objects) in the environment or to make gestures.

In some examples, the robot 100 can include a hydraulic system that operates the robot hands 128a, 128b and/or robotic legs 132a, 132b. In some examples, the hydraulic system can be completely hidden within the robot. In other examples, some parts of the hydraulic system can be disposed outside the robot (such as, for example, a fluid conduit 152 (e.g., a hose) as shown in FIG. 1B that transmits hydraulic pressure from a source to a target).

Example III—Example Robotic Torso Structure

Figure 2A:
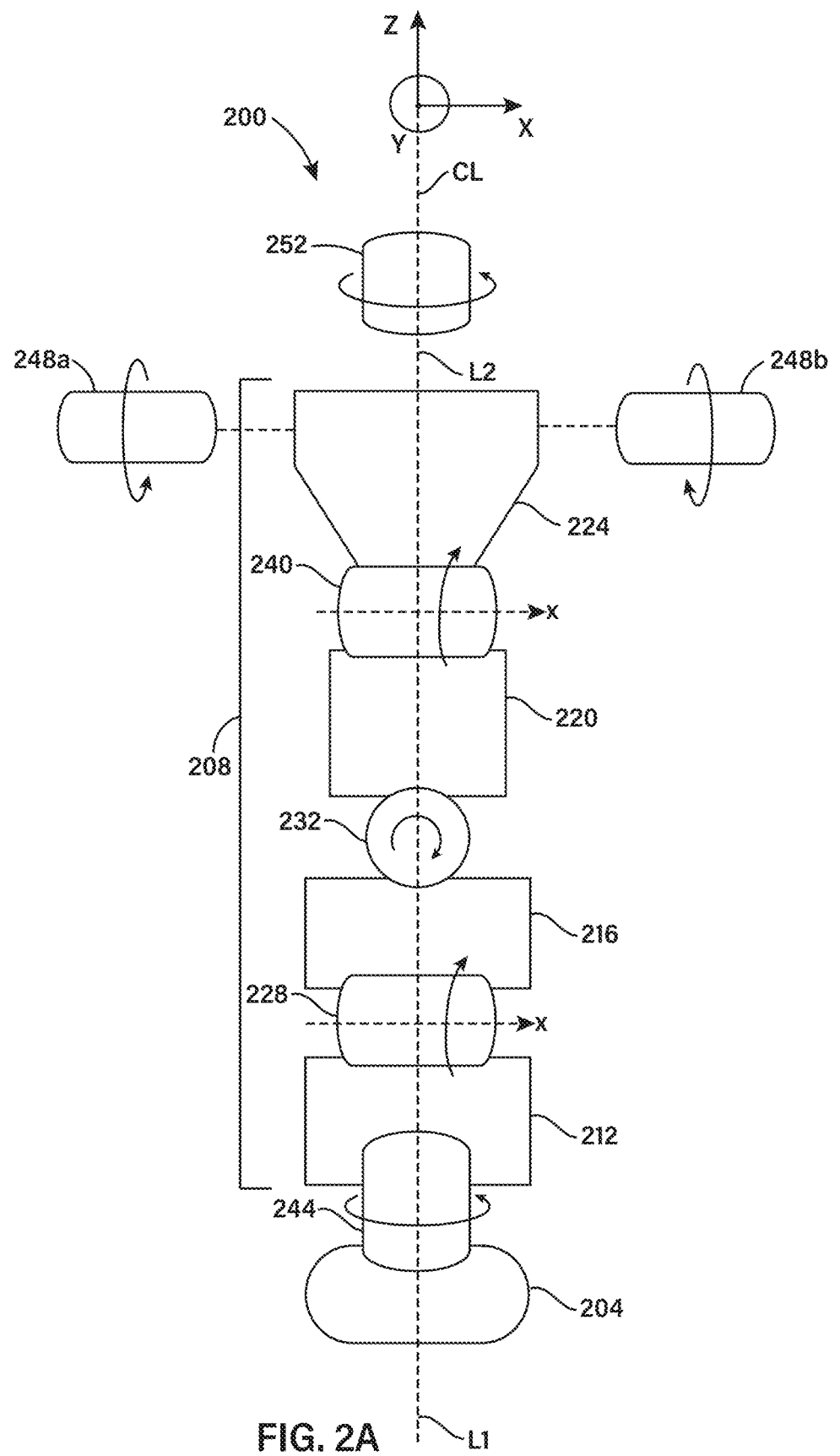
FIG. 2A is a schematic illustration of an exemplary robotic torso.
Figure 2B:
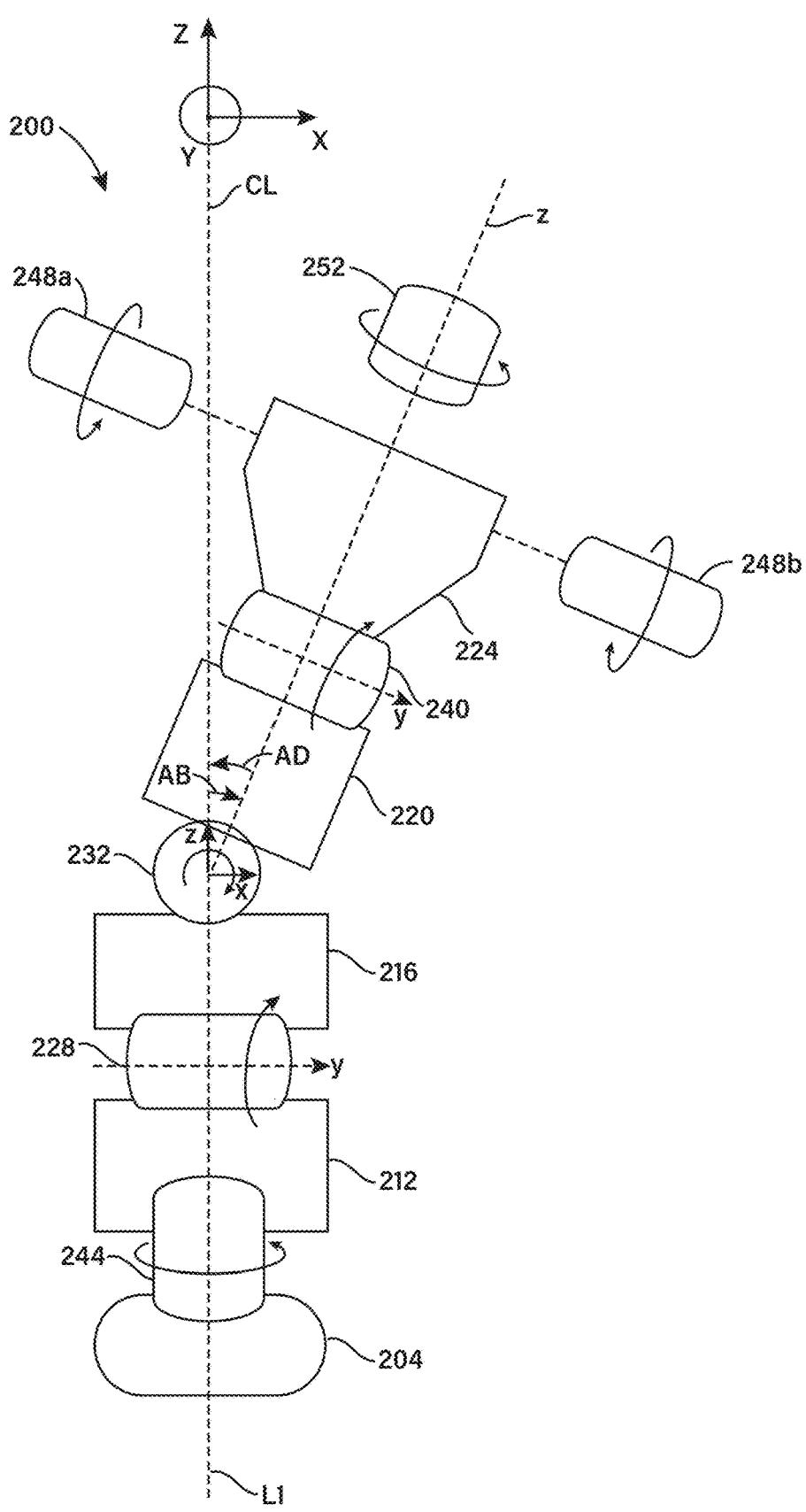
Figure 2C:
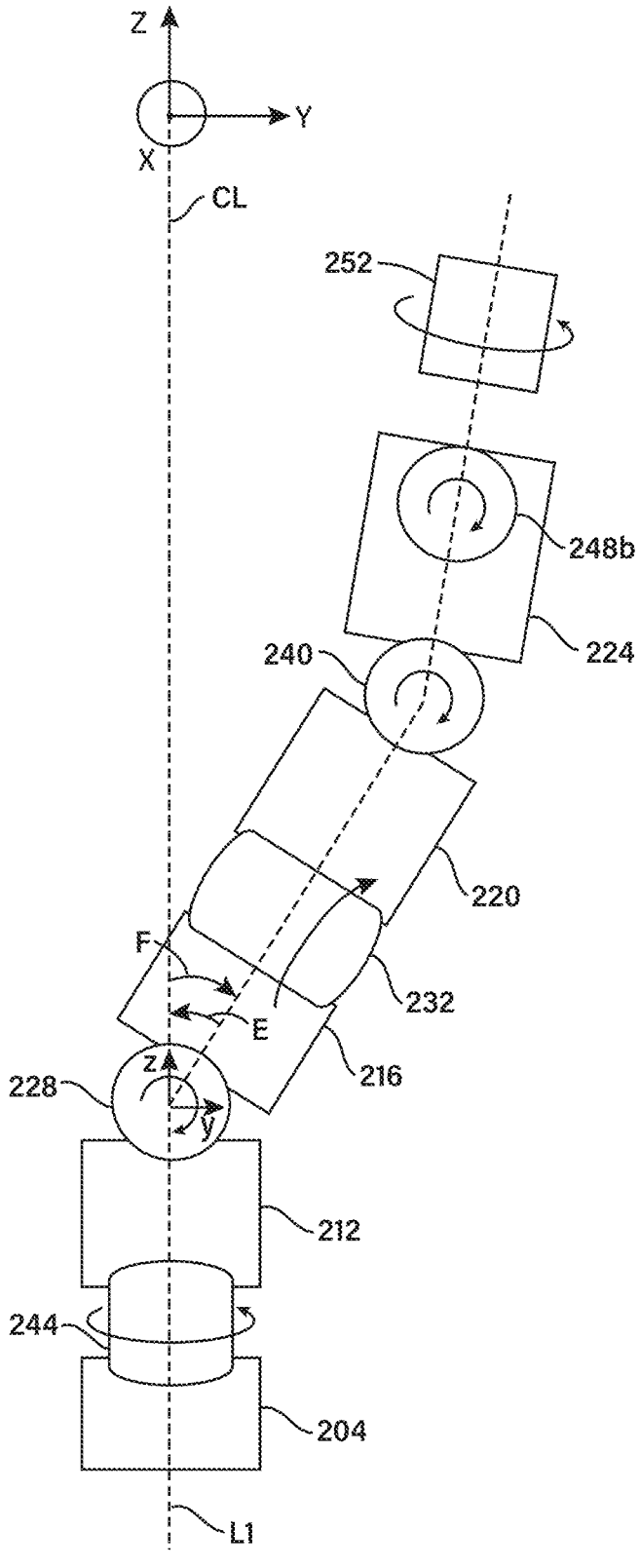
FIG. 2C illustrates a flexion-extension movement of the robotic torso of FIG. 2A.

FIG. 2A-2C illustrate an exemplary general structure of a robotic torso 200 that can be used as a torso of a humanoid robot (e.g., the robot 100 illustrated in FIGS. 1A and 1B). Exemplary subassemblies that can be coupled together to form a robotic torso having the general structure illustrated in FIGS. 2A-2C are described in Examples IV-VII. A method of assembling the subassemblies is described in Example VIII. An assembled robotic torso is described in Example IX.

The robotic torso 200 can include a torso base 204 and a torso column 208 coupled to the torso base 204. The robotic torso 200 can have a reference axis CL (which can be an axis passing through a midline of the robotic torso when the torso column is in a neutral position). The torso base 204 has an axial axis L1 that is aligned with the reference axis CL. The torso column 208 is an articulated column that permits the robotic torso 200 to be configured into various spatial poses in a 3D space. For example, portions of the torso column 208 can be deflected from the reference axis CL and/or the torso column 208 can be rotated about the reference axis CL to configure the robotic torso 200 into a desired spatial pose. Examples of spatial poses are illustrated in FIGS. 2B and 2C.

The torso column 208 can include a series of torso segments (e.g., torso segments 212, 216, 220, and 224) coupled together by a series of movable joints (e.g., movable joints 228, 232, 240). In some examples, the torso column 208 can be coupled to the torso base 204 by a movable joint 244. Each of the movable joints 228, 232, 240, 244 can have one or more degrees of freedom (DOFs). In some examples, the movable joints can be rotational joints having at least one DOF. In a particular example, the movable joints can be single DOF rotational joints (e.g., each rotational joint can be implemented with a rotary actuator).

In the convention used herein, the Z-axis of an XYZ coordinate system is parallel to the reference axis CL of the robotic torso 200, the X-axis can be an axis extending through the opposite lateral sides of the torso column 208 and orthogonal to the Z-axis, and the Y-axis can be an axis extending through the opposite front and back sides of the torso column 208 and orthogonal to the X-axis and the Z-axis.

Each movable joint in the torso column 208 can have a local xyz coordinate system that is fixed to the movable joint such that when the movable joint rotates in a plane, the local xyz coordinate system also rotates in the plane. The x-axis of a movable joint extends through opposite front and back of the torso column 208 at the movable joint. The y-axis of a movable joint extends through opposite sides of the torso column 208 at the movable joint. The z-axis can be aligned with a midline of a portion of the torso column 208 including the movable joint.

The torso column 208 can have a neutral position in which the torso column 208 is not bent about any axis and not rotated relative to the torso base 204. In the neutral position, the local xyz coordinate system can be aligned with the reference XYZ coordinate system. Articulation of the torso column 208 (e.g., bending or rotation of the torso column) can result in rotation of a movable joint in a plane and corresponding angular rotation of the local xyz coordinate system relative to the reference XYZ coordinate system.

Each movable joint in the torso column 208 can be configured to permit flexion-extension movements or abduction-adduction movements. Flexion movement occurs when the torso column 208 bends away from the reference axis CL and about an x-axis of the movable joint (see arrow F in FIG. 2C). Extension movement is the opposite of flexion movement. Extension movement occurs when a portion of the torso column bends towards the reference axis CL about an x-axis of the movable joint (see arrow E in FIG. 2C). Flexion and extension movements are forward to backward movements.

Abduction movement occurs when a portion of the torso column 208 bends away from the reference axis CL about a y-axis of the movable joint (see arrow AB in FIG. 2B). Adduction movement is the opposite of abduction movement. Adduction movement occurs when a portion of the torso column bends towards the reference axis CL and about a y-axis of the movable joint (see arrow AD in FIG. 2B). Abduction and adduction are side to side movements.

In the example illustrated in FIGS. 2A-2C, a first torso segment 212 is coupled to a second torso segment 216 by a first movable joint 228. The second torso segment 216 is coupled to a third torso segment 220 by a second movable joint 232. The third torso segment 220 is coupled to a fourth/last torso segment 224 by a third movable joint 240. Although the torso column 208 is illustrated with four torso segments, in some examples, the torso column 208 can have more than four torso segments (e.g., five or six torso segments). In the illustrated example, the first torso segment 212 is coupled to the torso base 204 by a fourth movable joint 244.

In one example, the first movable joint 228 can be a flexion-extension joint (e.g., configured to permit relative rotation between the first torso segment 212 and the second torso segment 216 about an x-axis of the movable joint). In one example, the second movable joint 232 can be an abduction-adduction joint (e.g., configured to permit relative rotation between the second torso segment 216 and the third torso segment 220 about a y-axis of the movable joint). In one example, the third movable joint 236 can be a flexion-extension joint (e.g., configured to permit relative rotation between the third torso segment 220 and the fourth torso segment 224 about a local x-axis). The fourth movable joint 244 can be configured to permit rotation of the torso column 208 about the reference axis CL.

Alternative configurations of the movable joints 228, 232, 236 in the torso column 208 are possible. For example, the first movable joint 228 can be configured as an abduction-adduction joint, and the second movable joint 232 can be configured as a flexion-extension joint. In addition, the torso column 208 can have additional torso segments with corresponding movable joints configured to permit any combination of flexion-extension and adduction-abduction movements such that the torso column 208 has one or more locations where flexion-extension movements can occur and one or more locations where abduction-adduction movements can occur.

The fourth/last torso segment 224 (which can be referred to herein as "torso chassis" 224) can include features for attachment of humanoid components (e.g., robotic head and robotic arms) and non-humanoid components (e.g., backpack) to the robotic torso 200. For example, the torso chassis 224 can include features to support shoulder joint actuators 248a, 248b for attachment of robotic arms. In another example, the torso chassis 224 can include features to support a neck joint actuator 252 for attachment of a robotic head. The torso column 208 can be configured with sufficient rigidity to support any components that may be attached to the torso chassis in any configured spatial pose of the robotic torso 200.

Example IV—Example Torso Base Subassembly

Figure 3A:
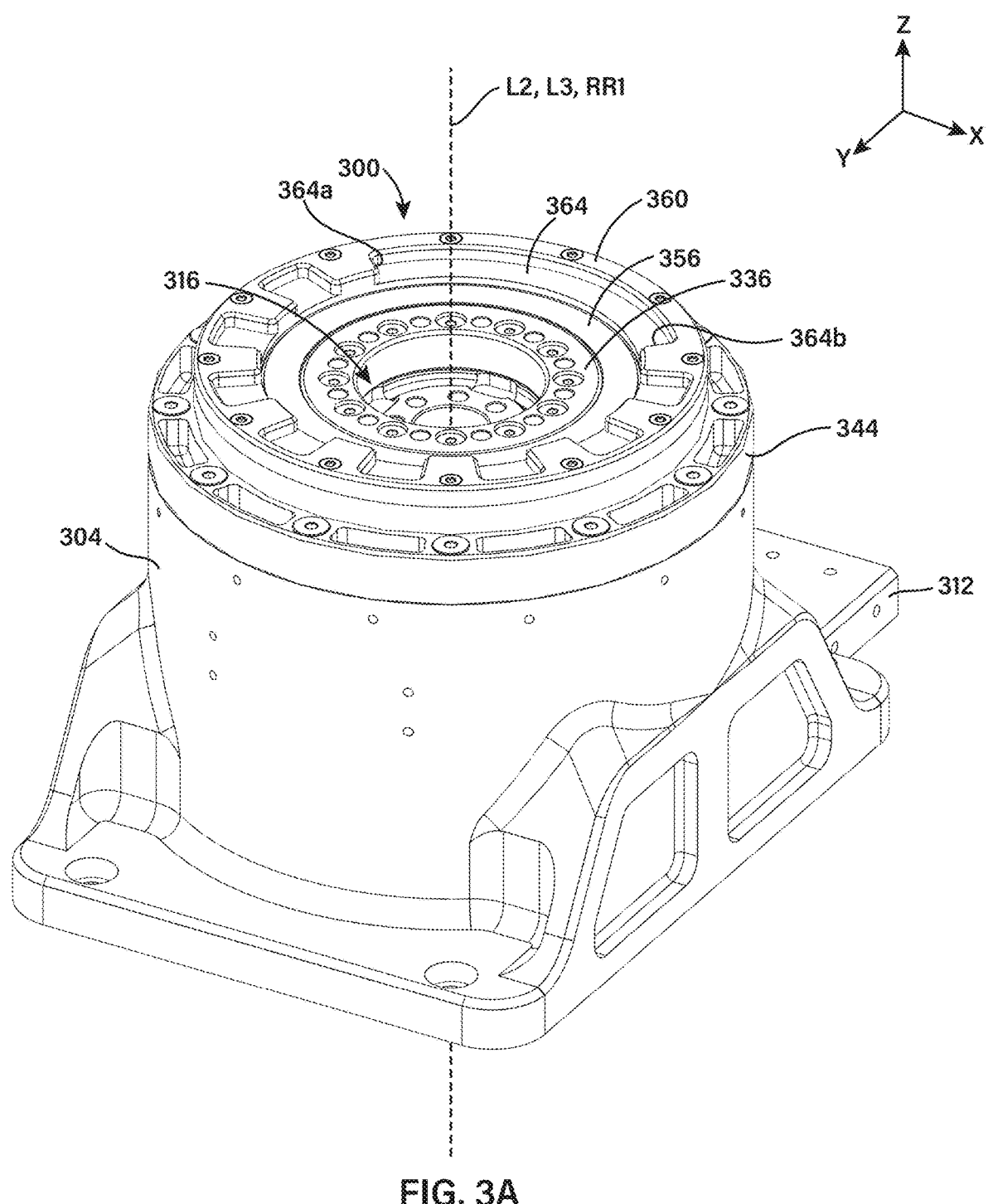
FIG. 3A is a perspective view of an exemplary torso base subassembly.
Figure 3B:
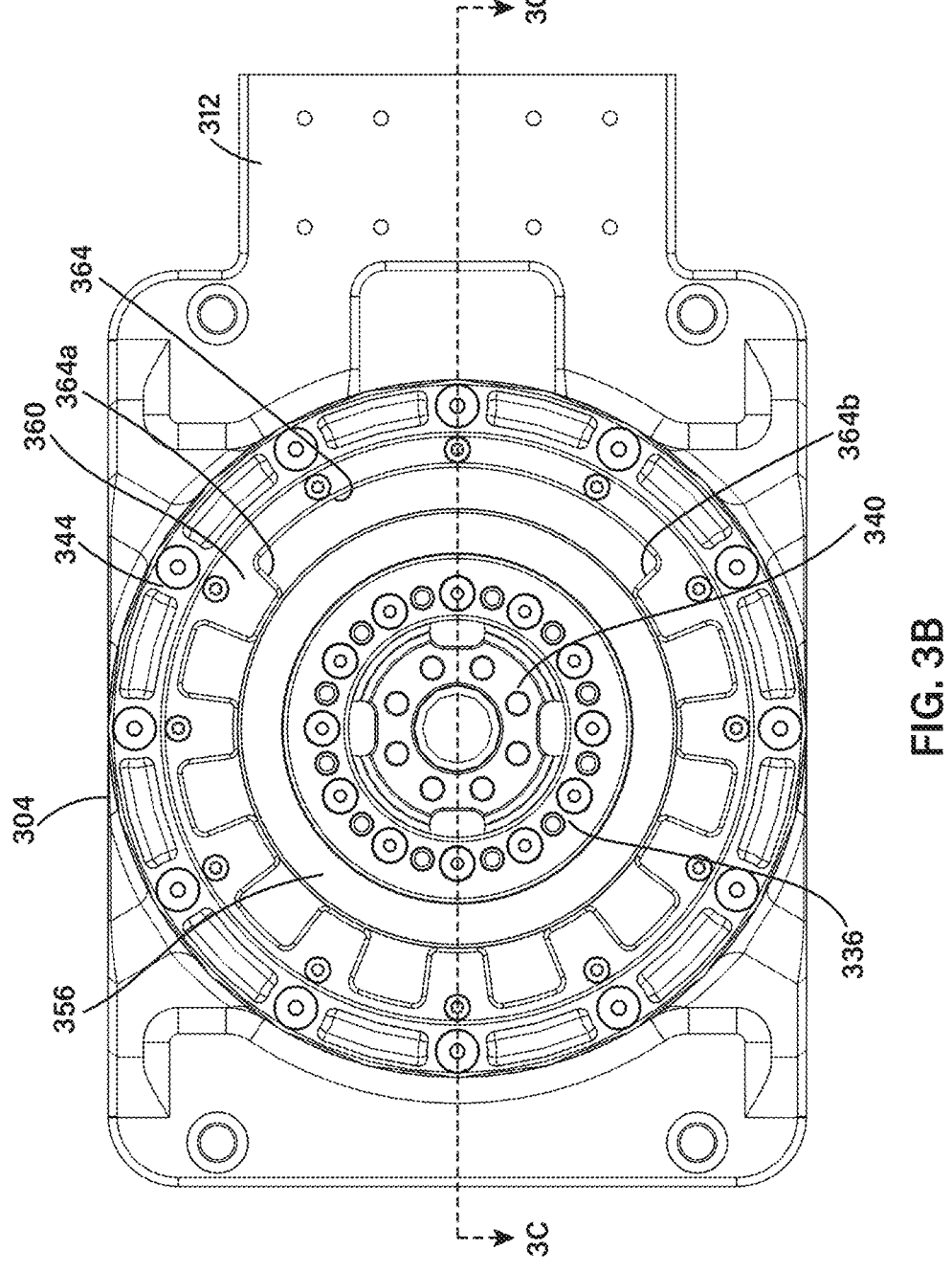
FIG. 3B is a top view of the torso base subassembly shown in FIG. 3A.
Figure 3C:
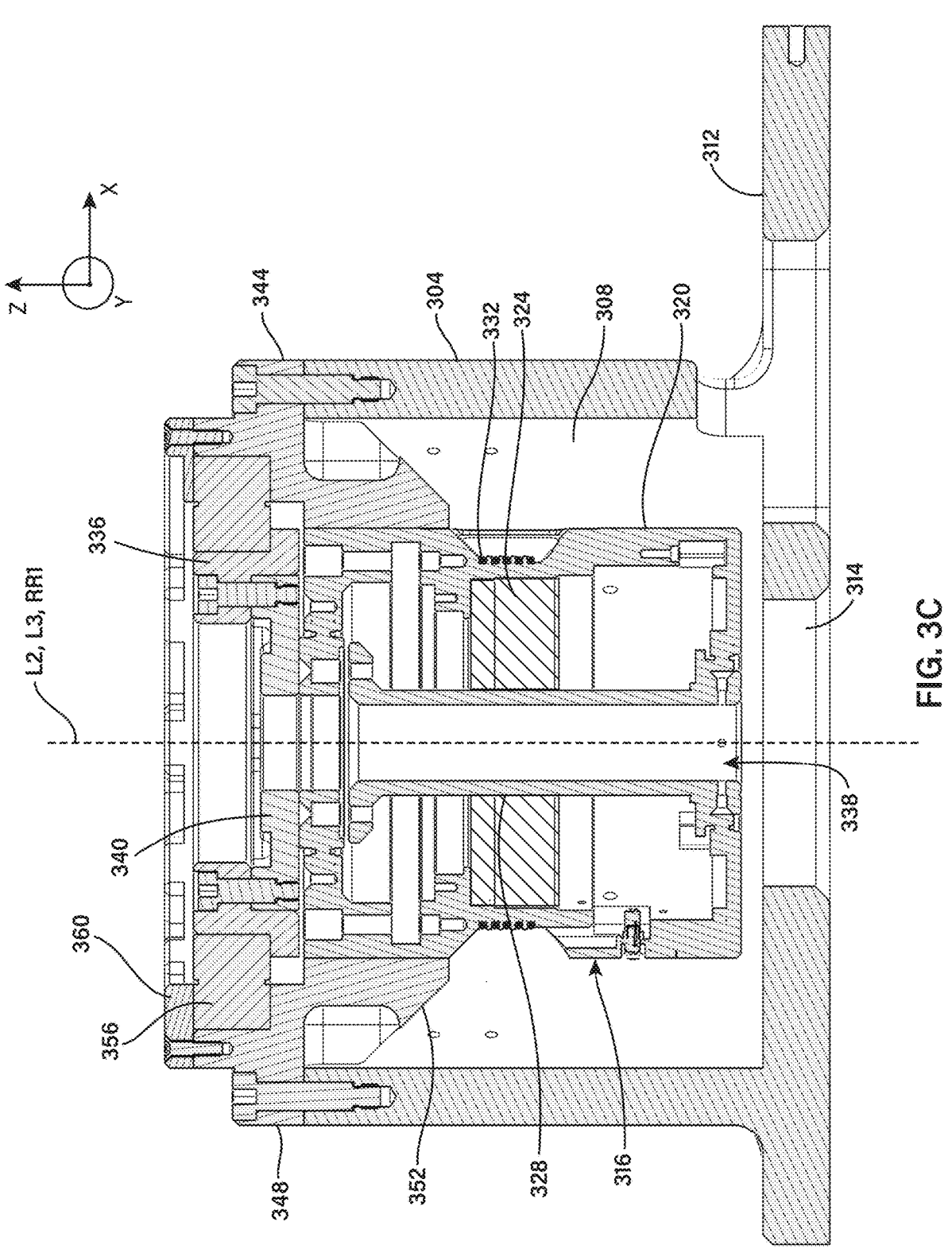
FIG. 3C is a cross-sectional view of the torso base subassembly of FIG. 3A along line 3C-3C as depicted in FIG. 3B.

FIGS. 3A-3C illustrate an exemplary torso base subassembly 300 that can be used in constructing a robotic torso according to Example III. For example, the torso base subassembly 300 can provide the torso base 204 in FIGS. 2A-2C and include features that form the movable joint 244 in FIGS. 2A-2C.

The torso base subassembly 300 can include a torso base 304 having an inner chamber 308 (see FIG. 3C) and an axial axis L2, which can be aligned with the reference axis (CL in FIGS. 2A-2C) of the robotic torso. The lower end of the torso base 304 can include a flange 312, which can be used to attach the torso base 304 to an object (such as a pedestal or torso hip).

The torso base subassembly 300 can include an actuator 316 mounted within the inner chamber 308. In some examples, the actuator 316 can be any type of rotary actuator, such as electrically-operated, hydraulically-operated, or pneumatically-operated rotary actuator. A simplified example of the actuator 316 as an electrically operated rotary actuator is illustrated in FIG. 3C. In the example, the actuator 316 includes an outer shell 320, a rotor 324 disposed within the outer shell 320, and an actuator shaft 328 extending through and coupled to the rotor 324. A portion of the outer shell 320 circumscribing the rotor 324 includes stator windings 332. The rotor 324 and stator windings 332 can operate as an electric motor, as is known in the art.

In one example, a torque sensor mount 336 can be coupled to one end of the actuator shaft 328 such that the torque sensor mount 336 is rotatable with the actuator shaft 328. A torque sensor 340 can be attached to the torque sensor mount 336 in a position to measure torque on the actuator shaft 328. In this example, the torque sensor mount 336 can function as the coupling end of the actuator shaft 328.

In some examples, the actuator 316 can be a hollow actuator having a central opening that allows for passage of power distribution cables and other line structures (such as hydraulic lines). For example, the actuator 316 can include a central opening 338 that extends through the actuator shaft 328, the torque sensor 340, and the torque sensor mount 336. The opening 338 can be aligned with an opening 314 in the flange 312. The actuator 316 can have other components not shown (such as drivers, bearings for the actuator shaft, etc.).

The actuator 316 can have a rotational axis RR1 defined by an axial axis L3 of the actuator shaft 328. The actuator 316 can be mounted within the inner chamber 308 of the torso base 304 such that the rotational axis RR1 of the actuator 316 is aligned with the axial axis L2 of the torso base 304. The actuator 316 can be operated to rotate the actuator shaft 328 about the rotational axis RR1, which would cause rotation of the torque sensor mount 336 about the rotational axis RR1.

The torso base subassembly 300 can include features to support rotation of the torque sensor mount 336 (or output end of the actuator shaft 328 in general). In one example, the torso base subassembly 300 can include an annular bracket 344 having a ring shape such that it can be disposed between the torso base 304 and the actuator 316. The annular bracket 344 can have a flange portion 348 attached to an upper end of the torso base 304 and a tapered portion 352 that extends into an annular space between an inner wall of the torso base 304 and an outer wall of the actuator 316 and circumscribes the actuator 316.

A bearing 356 can be arranged between the annular bracket 344 and the torque sensor mount 336. The bearing 356 can support rotation of the torque sensor mount 336 (or output end of the actuator shaft 328) relative to the annular bracket 344 and maintain alignment of the rotational axis RR1 of the actuator 316 with the axial axis L2 of the torso base 304.

The torso base subassembly 300 can include a feature to limit the rotational range of an object coupled to the output end of the actuator 316 (e.g., coupled to the torque sensor mount 336). In one example, the torso base subassembly 300 can include a rotational stop member 360, which can be in the form of an annular disc. The rotational stop member 360 can be disposed radially of the torque sensor mount 336, for example, by attaching the rotational stop member 360 to the flange portion 348 of the annular bracket 344. The rotational stop member 360 can include a partial circular slot 364 (shown in FIGS. 3A and 3B) that can receive a tab from an object coupled to the torque sensor mount 336 (or to the actuator shaft 328) and whose rotational range is to be limited. When the torque sensor mount 338 (or actuator shaft 328) rotates, the tab will move along the circular path of the partial circular slot 364 in a clockwise or counterclockwise direction. The range of motion of the tab will be limited by the angular range of the partial circular slot 364 (e.g., when the tab reaches either of the end walls 364a, 364b of the partial circular slot). There is also the possibility of forming the tab in the rotational stop member 360 and allowing the object whose rotational range is to be limited to have the partial circular slot instead of the tab. In this other example, the tab in the rotational stop member will extend into the partial circular slot of the object, and the motion of the tab will be limited by the circular extent of the partial circular slot.

In some examples, the rotational stop member 360 can extend radially over a portion of the bearing 356 (as shown more clearly in FIG. 3C), forming a lip over the bearing 356 that retains the bearing 356 between the annular bracket 344 and the torque sensor mount 336.

Example V—Example Torso Segment Subassembly

FIGS. 4A-4D illustrate an exemplary torso segment subassembly 400 that can be used in constructing a robotic torso according to Example III. For example, the torso segment subassembly 400 can provide the first torso segment 212 in FIGS. 2A-2C and include features that can form the movable joints 228, 244 in FIGS. 2A-2C.

The torso segment subassembly 400 can include a bracket 402 having a flange 404 that can be used to mount the torso segment subassembly 400 to another section of a robotic torso (e.g., to the torso base subassembly 300 described in Example IV). For example, the flange 404 can be attached to the coupling end of the actuator shaft 328 (e.g., to the torque sensor mount 336) of the actuator 316 in the torso base subassembly 300 (see FIG. 3C and Example IV). In some examples, the flange 404 can be in the form of a circular flange having a flat surface 405 to mate with a corresponding flat surface at the coupling end of the actuator shaft 328 (e.g., the top surface of the torque sensor mount 336 coupled to the actuator shaft 328 as shown in FIG. 3C). The flange 404 can include openings to receive fasteners or have other features to enable releasable attachment of the flange 404 to the coupling end of the actuator shaft 328.

The bracket 402 includes an actuator support portion 406 attached to (or integrally formed with) the flange 404. In the illustrated example, the actuator support portion 406 includes two end members 408, 410 projecting perpendicularly from the flange 404. The end members 408, 410 can be flat ring members with central openings 409, 411. The actuator support portion 406 can have a longitudinal axis L4. The end members 408, 410 (see FIG. 4C) can be spaced apart along the longitudinal axis L4 and aligned such that the central openings 409, 411 are axially aligned along the longitudinal axis L4.

Figure 4A:
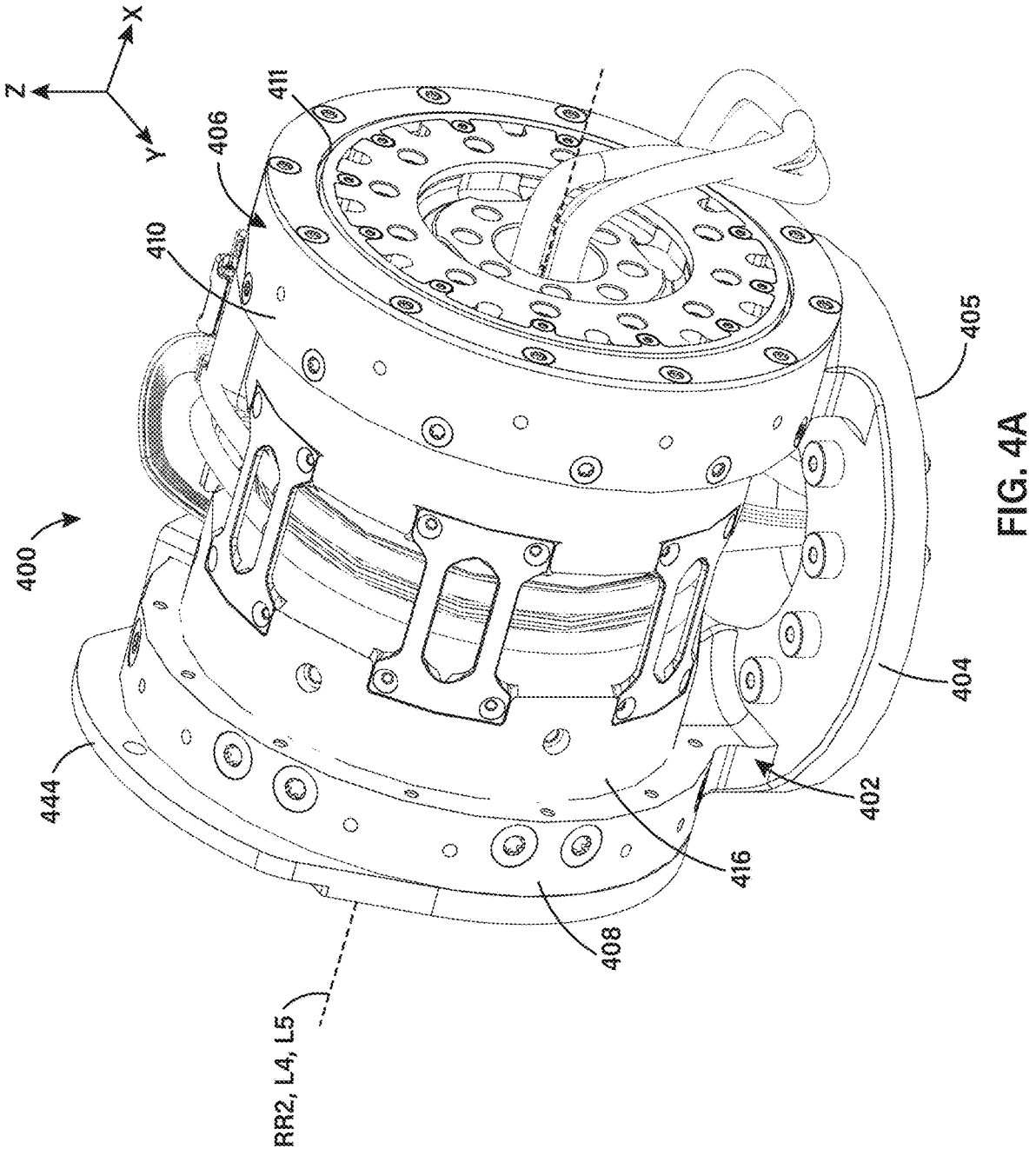
FIG. 4A is a perspective view of an exemplary torso segment subassembly.
Figure 4B:
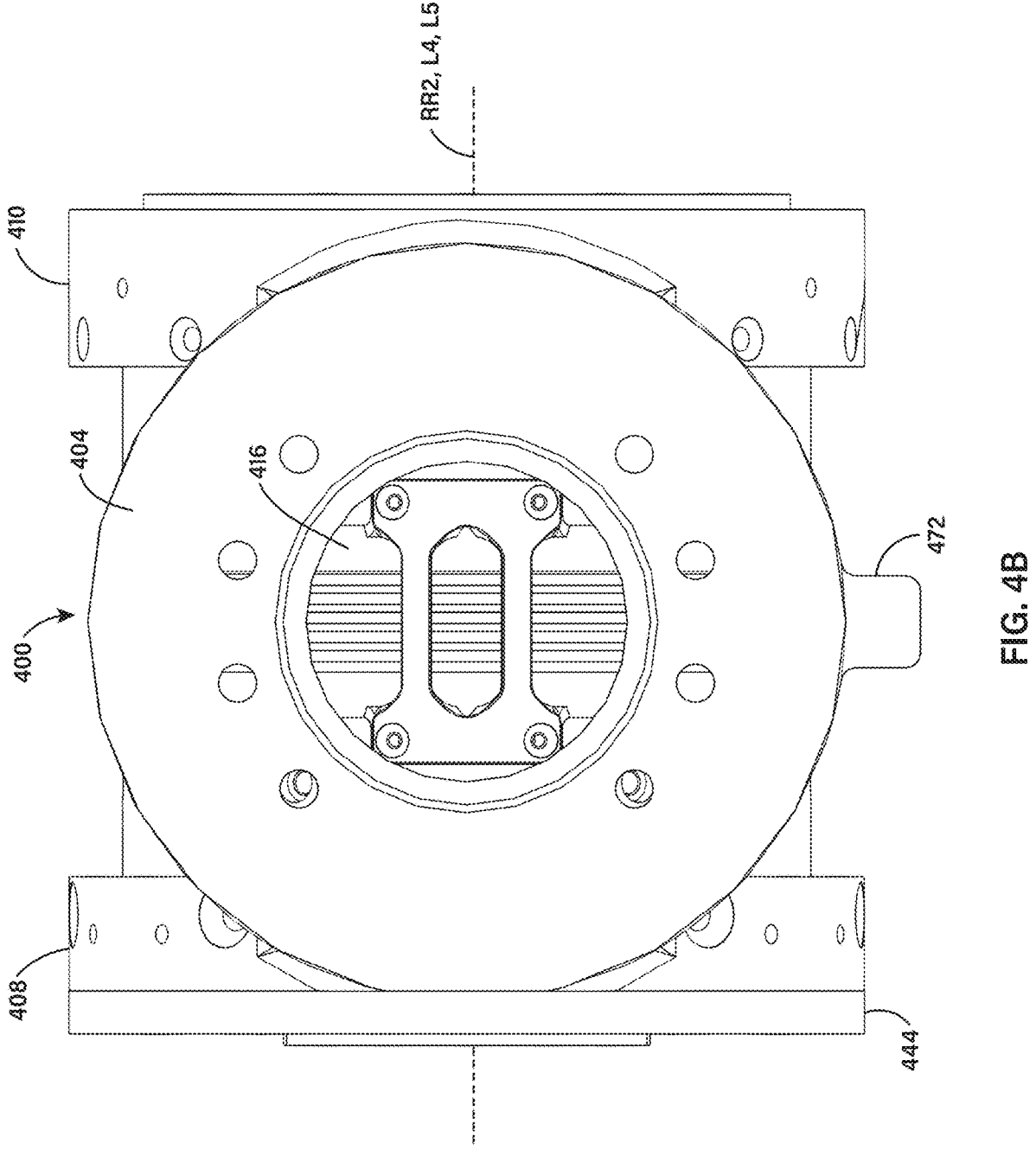
FIG. 4B is a bottom view of an torso segment subassembly.
Figure 4C:
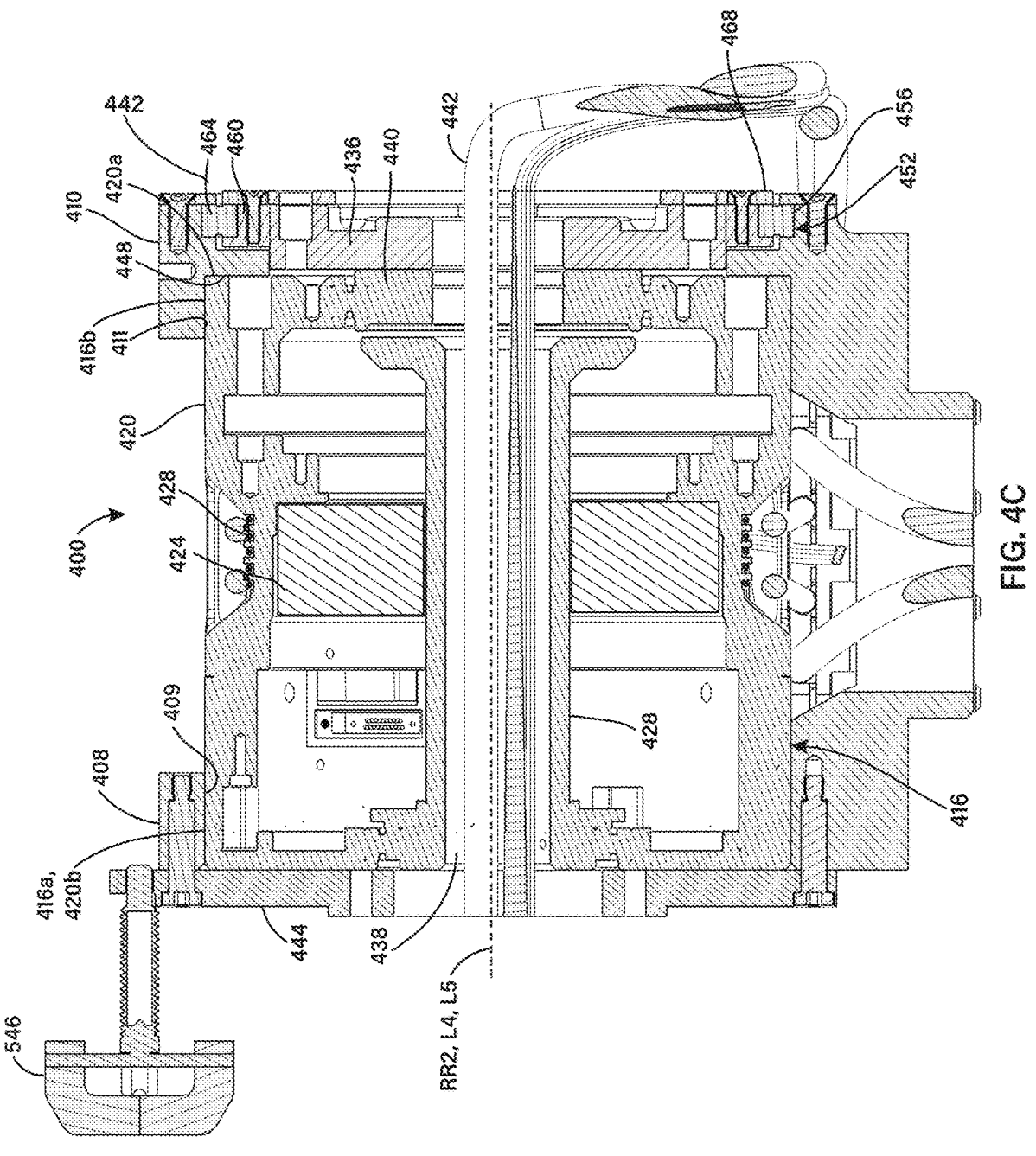
FIG. 4C is a cross-sectional view of the torso segment subassembly of FIG. 4A along line 4C-4C as depicted in FIG. 4D.
Figure 4D:
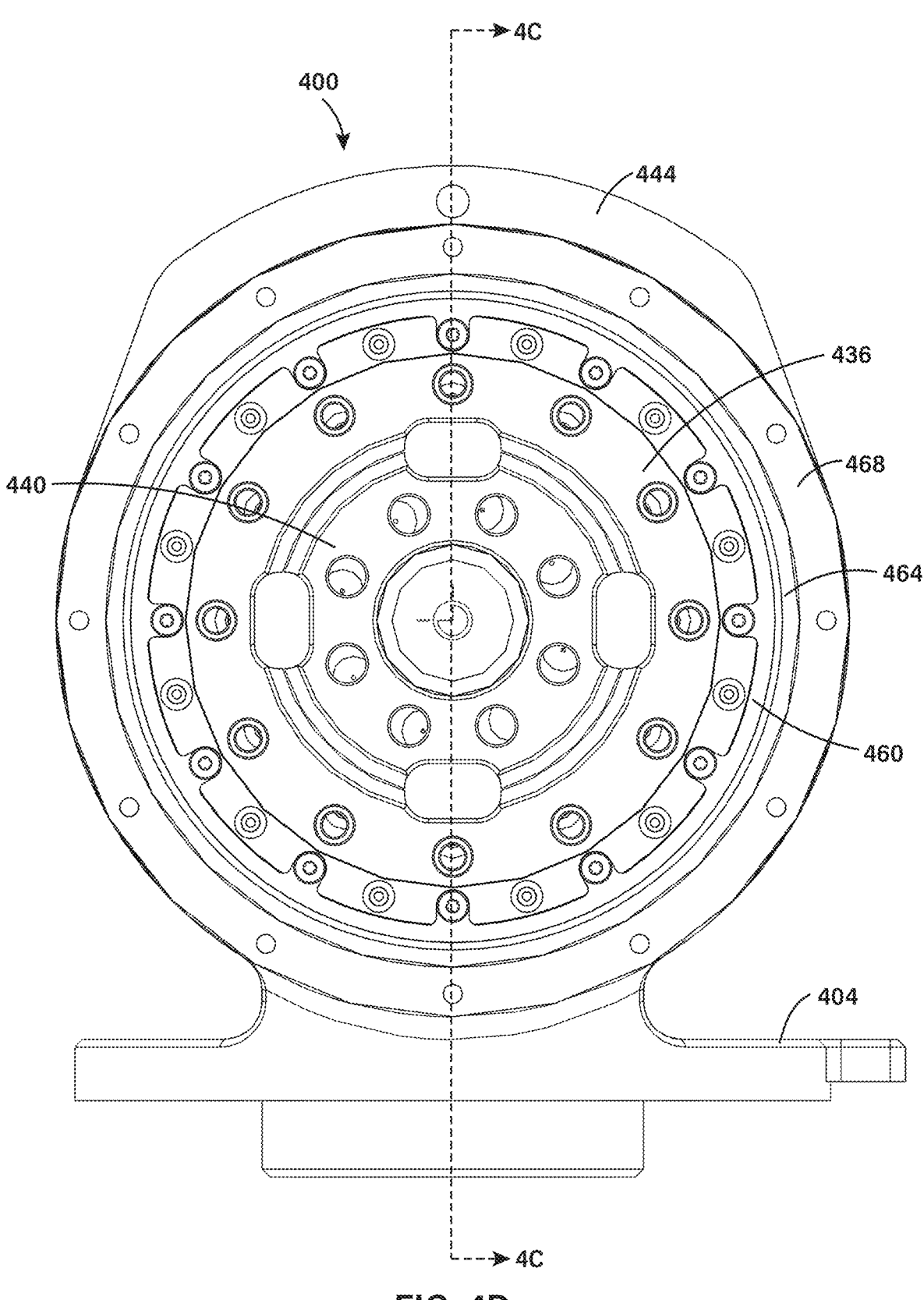
FIG. 4D is an end view of the torso segment subassembly of FIG. 4A.

The torso segment subassembly 400 can include an actuator 416 mounted in the actuator support portion 406. In some examples, the actuator 416 can be any type of rotary actuator, such as electrically-operated, hydraulically-operated, or pneumatically-operated rotary actuator. A simplified example of the actuator 416 as an electrically-operated rotary actuator is illustrated in FIG. 4C. In the example, the actuator 416 includes an outer shell 420, a rotor 424 disposed within the outer shell 420, and an actuator shaft 428 extending through and coupled to the rotor 424. A portion of the outer shell 420 circumscribing the rotor 424 includes stator windings 432. The rotor 424 and stator windings 432 operate as an electric motor, as is known in the art.

In one example, a torque sensor mount 436 can be coupled to one end of the actuator shaft 428 such that the torque sensor mount 436 is rotatable with the actuator shaft 428. A torque sensor 440 can be attached to the torque sensor mount 436 in a position to measure torque on the actuator shaft 428. In this example, the torque sensor mount 436 can also function as the coupling end of the actuator shaft 428.

In some examples, the actuator 416 can be a hollow actuator having a central opening that allows for passage of power distribution cables (e.g., cables 442) and other line structures (such as hydraulic lines). For example, the actuator 416 can include a central opening 438 that extends through the actuator shaft 428, the torque sensor 440, and the torque sensor mount 436. The actuator 416 can have other components not shown (such as drivers, bearings for the actuator shaft, etc.).

The actuator 416 can have a rotational axis RR2 defined by an axial axis L5 of the actuator shaft 428. The actuator 416 can be mounted in the actuator support portion 406 (e.g., supported by the end members 408, 410) such that the rotational axis RR2 of the actuator 416 is aligned with the longitudinal axis L4 of the actuator support portion 406. To use the actuator 416 in forming a movable joint that permits rotation about an x-axis (e.g., a flexion-extension joint), the bracket 402 can be oriented such that the longitudinal axis L4 of the actuator support portion 406 is aligned with the X-axis when the robotic torso/torso column is in a neutral position. (In other examples, to use the actuator 416 in forming a movable joint that permits rotation about a y-axis (e.g., an abduction-adduction joint), the bracket 402 can be oriented such that the longitudinal axis L4 of the actuator support portion 406 is aligned with the Y-axis when the robotic torso/torso column is in the neutral position.)

In the illustrated example, a first end portion 416a of the actuator 416 is received within the opening 409 of the end member 408. An end 420b of the outer shell 420 at the first end portion 416a of the actuator 416 can be secured to the end member 408 (e.g., using fasteners that extend through aligned radial openings in the first end portion 416a and the end member 408). A coupling end cap 444 can be mounted at an outer end of the end member 408. The coupling end cap 444 can be used to couple the end member 408 to another torso segment subassembly. In some examples, the coupling end cap 444 can include an opening 442 that can receive a portion of a lock member 802 (e.g., a spring plunger). The lock member 802 can be used to lock the movable joint formed between the torso segment subassembly 400 and another torso segment subassembly by the actuator 416.

A second end portion 416b of the actuator 416 can extend into the opening 411 of the end member 410. In some examples, the end member 410 can have an annular shoulder 448 projecting radially within the opening 411. An end 420a of the outer shell 420 of the actuator 416 received in the opening 411 can abut the shoulder 448 such that the outer shell 420 is retained between the annular shoulder 448 and the coupling end cap 444. The torque sensor mount 436 forming the coupling end of the actuator shaft 428 can extend forward of the end 420a of the outer shell 420 and through the opening of the annular shoulder 448.

The actuator support portion 406 can include features to support rotation of the torque sensor mount 436 (or coupling end of the actuator shaft 428). In one example, a bearing 452 can be disposed in an annular space 456 formed between the end member 410 and the torque sensor mount 436 to support rotation of the torque sensor mount 436. In some examples, the bearing 452 can include an inner race member 460 disposed radially of and attached to the torque sensor mount 436. The bearing 452 can include an outer race member 464 disposed between the inner race member 460 and the end member 410. The outer race member 464 can be attached to the end member 410. Bearing elements (such as ball elements) can be disposed between the inner race member 460 and the outer race member 464. The inner race member 460 will rotate within the outer race member 464 when the actuator shaft 428 is rotated. A bearing end cap 468 can be attached to the outer end of the end member 410 and can form a lip over the bearing 452 that retains the bearing 452 in the annular space 456 between the end member 410 and the torque sensor mount 436.

Figure 4E:
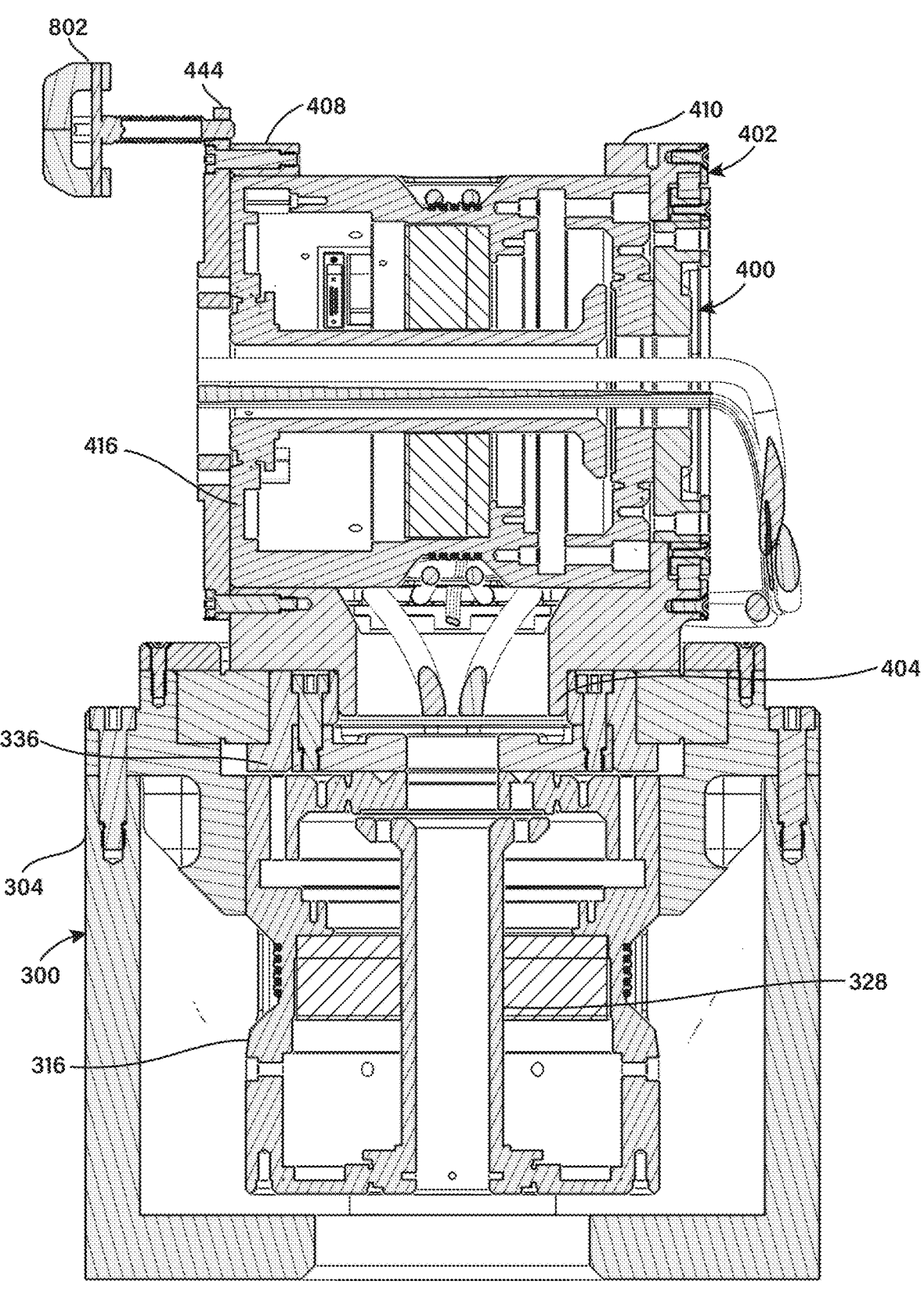
FIG. 4E is a cross-sectional view illustrating coupling of the torso segment subassembly of FIG. 4A to the torso base subassembly of FIG. 3A.
Figure 4F:
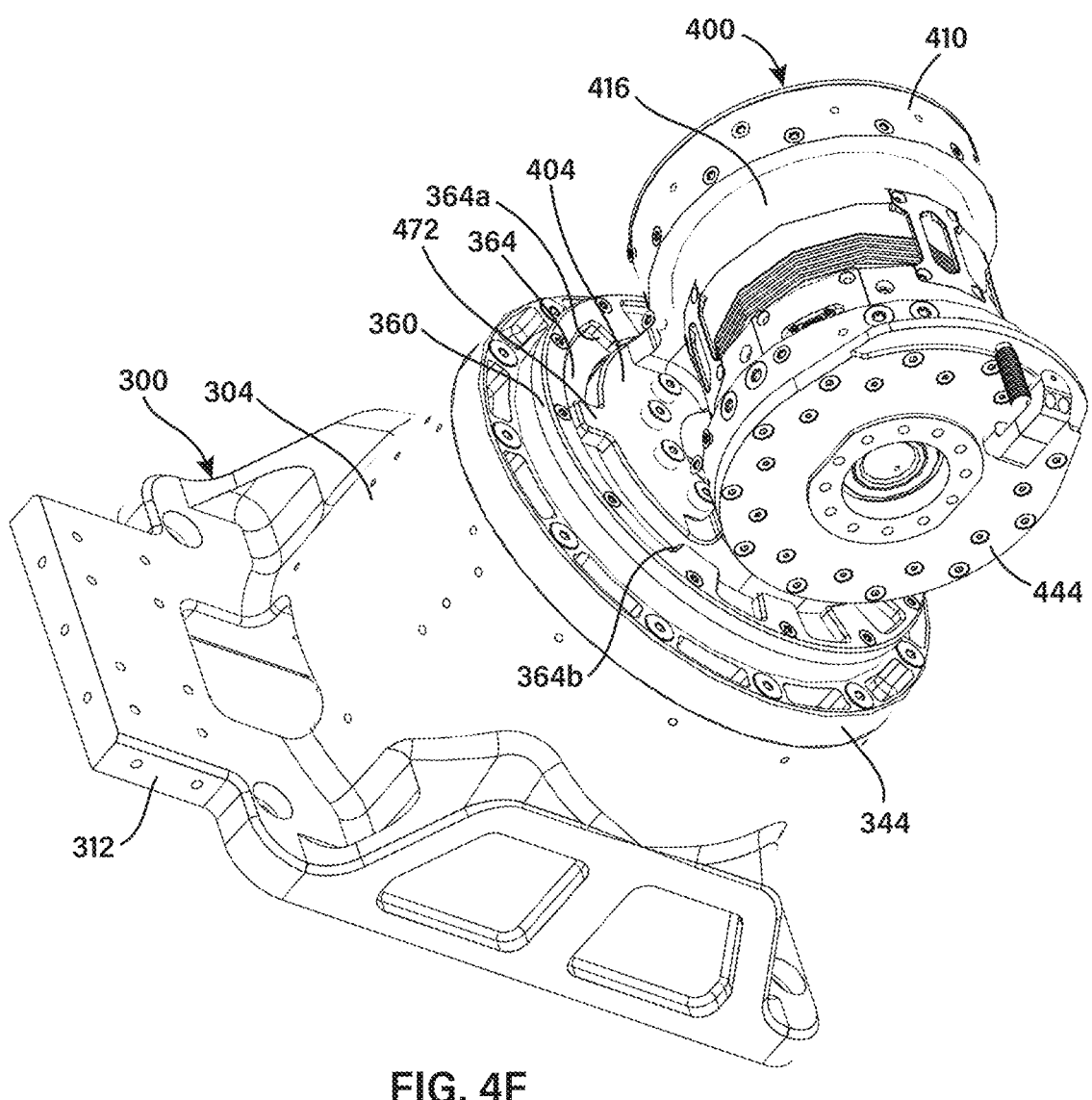
FIG. 4F is a perspective view illustrating coupling of the torso segment subassembly of FIG. 4A to the torso base subassembly of FIG. 3A.

FIGS. 4E and 4F illustrate coupling of the torso segment subassembly 400 to the torso base subassembly 300. In the example, the flange 404 is mounted on the torque sensor mount 336 of the actuator 316 and secured to the torque sensor mount 336 (e.g., using fasteners). The rotational stop member 360 is disposed radially about the flange 404. In some examples, the flange 404 can include a tab 472 that can extend radially into the partial circular slot 364 in the rotational stop member 360. The tab 472 and partial circular slot 364 can cooperate to limit a rotational range of the torso segment subassembly 400. For example, when the actuator shaft 328 of the actuator 316 rotates, this rotation is transferred to the flange 404 via the coupling between the flange 404 and the torque sensor mount 336. As the flange 404 rotates, the tab 472 will move along a circular path of the partial circular slot 364 until reaching either of the end walls 364a, 364b of the partial circular slot 364. The angular range of the partial circular slot determines the rotational range of the torso segment assembly 400.

Example VI—Example Torso Segment Subassembly

FIGS. 5A-5E illustrate an exemplary torso segment subassembly 500 that can be used in constructing a robotic torso according to Example III. For example, the torso segment subassembly 500 can provide any of the second and third torso segments (or intermediate torso segments) 216, 220 in FIGS. 2A-2C and include features that can form any of the movable joints 232, 240 in FIGS. 2A-2C.

The torso segment subassembly 500 can include a bracket 502 having a actuator support portion 504 with a longitudinal axis L6 and a actuator connection portion 506 with a longitudinal axis L7. The longitudinal axes L6 and L7 are orthogonal to each other such that two actuators can be coupled to the bracket 502 in a crosswise manner. For example, one actuator can be oriented to provide rotation about an x-axis, and the other actuator can be oriented to provide rotation about a y-axis.

In the illustrated example, the actuator support portion 504 can include two end members 508, 510 spaced apart along the longitudinal axis L6. The end members 508, 510 can be ring members with central openings 509, 511. The end members 508, 510 can be arranged parallel to each other, with the central openings 509, 511 axially aligned along the longitudinal axis L6. The actuator support portion 504 can include a strut 512 extending between and connected to the end members 508, 510.

Figure 5A:
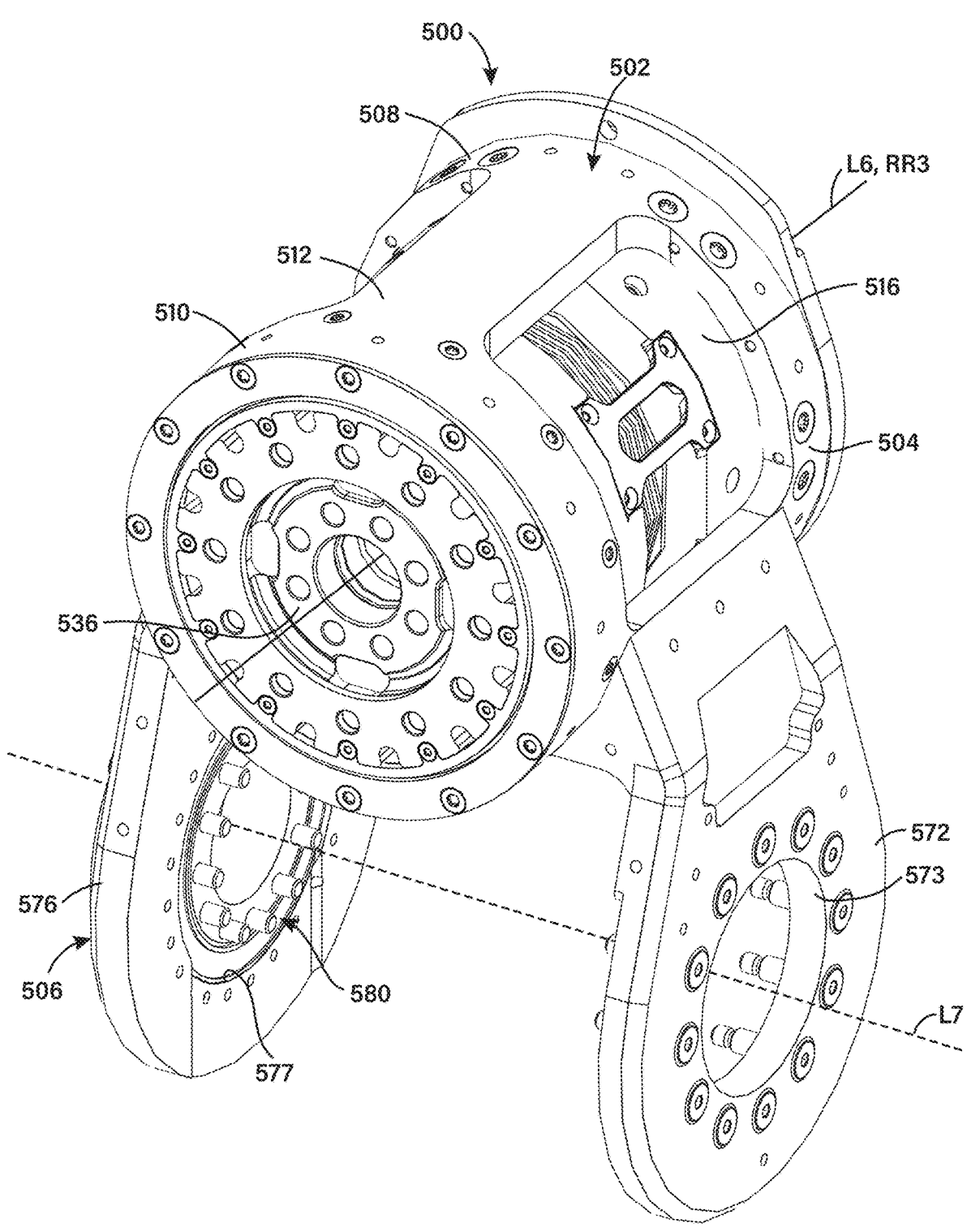
FIG. 5A is a perspective of an exemplary torso segment subassembly.
Figure 5B:
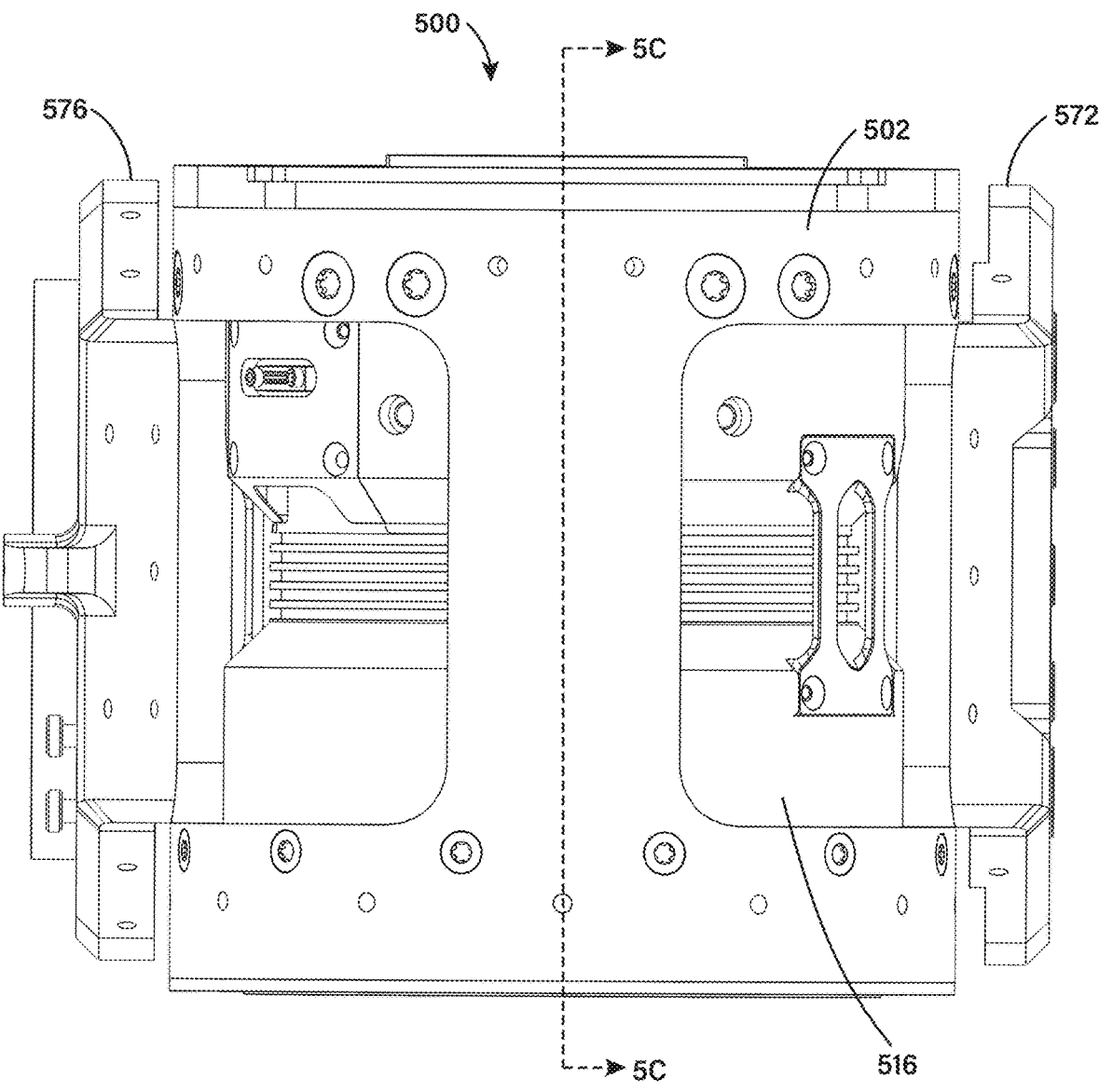
FIG. 5B is a top view of the torso segment subassembly shown in FIG. 5A.
Figure 5C:
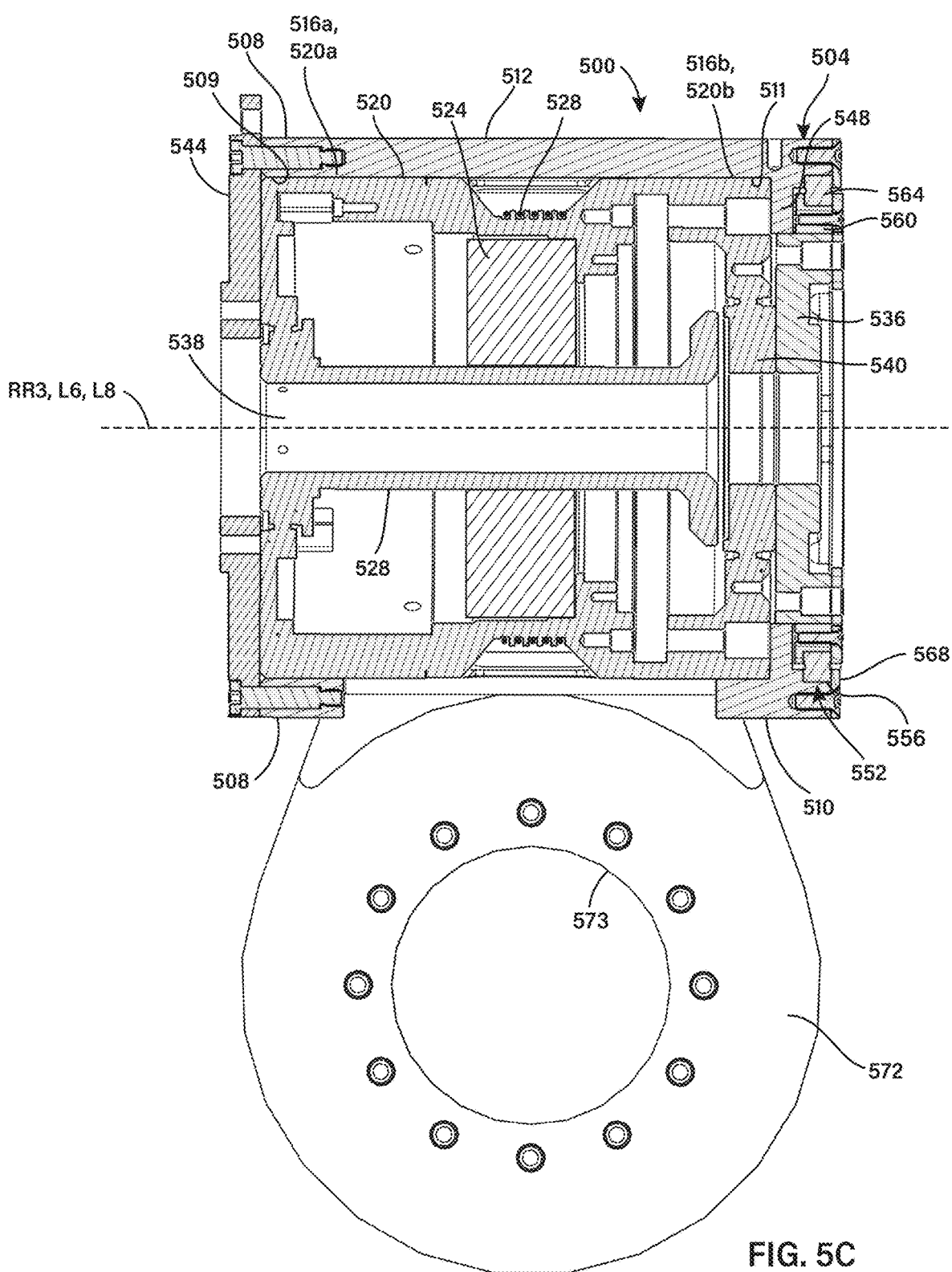
FIG. 5C is a cross-sectional view of the torso segment subassembly of FIG. 5A along line 5C-5C as depicted in FIG. 5B.

The torso segment subassembly 500 can include an actuator 516 supported on the actuator support portion 504. In some examples, the actuator 516 can be any type of rotary actuator, such as electrically-operated, hydraulically-operated, or pneumatically-operated rotary actuator. A simplified example of the actuator 516 as an electrically-operated rotary actuator is illustrated in FIG. 5C. In the example, the actuator 516 includes an outer shell 520, a rotor 524 disposed within the outer shell 520, and an actuator shaft 528 extending through and coupled to the rotor 524. A portion of the outer shell 520 circumscribing the rotor 524 includes stator windings 532. The rotor 524 and stator windings 532 operate as an electric motor, as is known in the art.

In one example, a torque sensor mount 536 can be coupled to one end of the actuator shaft 528 such that the torque sensor mount 536 is rotatable with the actuator shaft 528. A torque sensor 540 can be attached to the torque sensor mount 536 in a position to measure torque on the actuator shaft 528. In this example, the torque sensor mount 536 can also function as the coupling end of the actuator shaft 528.

In some examples, the actuator 516 can be a hollow actuator having a central opening that allows for passage of power distribution cables and other line structures (such as hydraulic lines). For example, the actuator 516 can include a central opening 538 that extends through the actuator shaft 528, the torque sensor 540, and the torque sensor mount 536. The actuator 516 can have other components not shown (such as drivers, bearings for the actuator shaft, etc.).

The actuator 516 can have a rotational axis RR3 defined by the axial axis L8 of the actuator shaft 528. The actuator 516 can be mounted in the actuator support portion 504 (e.g., supported by the end members 508, 510) such that the rotational axis RR3 of the actuator 516 is aligned with the longitudinal axis L6 of the actuator support 504. To use the actuator 516 in forming a movable joint that permits rotation about a y-axis (e.g., an abduction-adduction joint), the bracket 502 can be oriented such that the longitudinal axis L6 of the actuator support 504 is aligned with the Y-axis when the robotic torso is in the neutral position. (In other examples, to use the actuator 516 in forming a movable joint that permits rotation about an x-axis (e.g., a flexion-extension joint), the bracket 502 can be oriented such that the longitudinal axis L6 of the actuator support 504 is aligned with the Y-axis when the robotic torso is in the neutral position.)

In the illustrated example, as shown more clearly in FIG. 5C, a first end portion 516a of the actuator 516 is received within the opening 508a of the end member 508. An end portion 520a of the outer shell member 520 of the actuator 516 can be secured to the end member 508 at the opening 508a (e.g., using fasteners that extend through aligned radial openings in the outer shell member 520 and the end member 508). A coupling end cap 544 can be mounted at an outer end of the end member 508. The coupling end cap 544 can be used to couple the end member 508 to another torso segment subassembly.

A second end portion 516b of the actuator 516 can extend into the opening 510a of the end member 510. In some examples, the end member 510 can have an annular shoulder 548 projecting radially within the opening 510*a*. An end portion 520*b* of the outer shell 520 of the actuator 516 received in the opening 510*a* can abut the shoulder 548 such that the outer shell 520 is retained between the annular shoulder 548 and the coupling end cap 544. The torque sensor mount 536 forming the coupling end of the actuator shaft 528 can extend forward of the end portion 520*b* of the outer shell 520 and through the opening of the annular shoulder 548.

The actuator support portion 504 can include features to support rotation of the torque sensor mount 536 (or coupling end of the actuator shaft 528). In one example, a bearing 552 can be disposed in an annular space 556 formed between the end member 510 and the torque sensor mount 536 to support rotation of the torque sensor mount 536. In some examples, the bearing 552 can include an inner race member 560 disposed radially of and attached to the torque sensor mount 536. The bearing 552 can include an outer race member 564 disposed between the inner race member 560 and the end member 510. The outer race member 564 can be attached to the end member 510. The inner race member 560 will rotate within the outer race member 564 when the actuator shaft 528 is rotated. A bearing end cap 568 can be attached to the outer end of the end member 510 and can form a lip over the bearing 552 that retains the bearing 552 in the annular space between the end member 510 and the torque sensor mount 536.

Figure 5D:
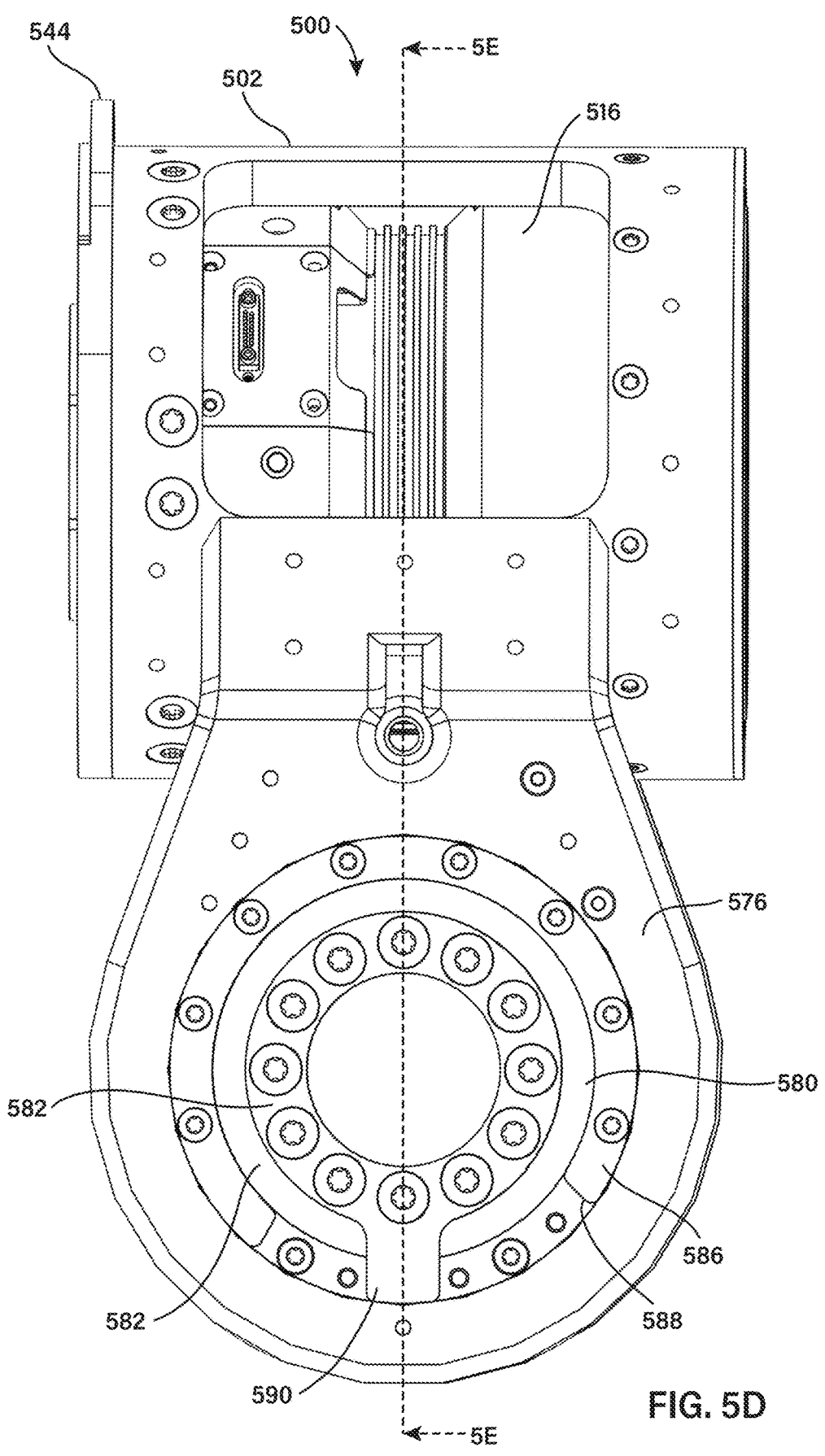
FIG. 5D is a side view of the torso segment subassembly.
Figure 5E:
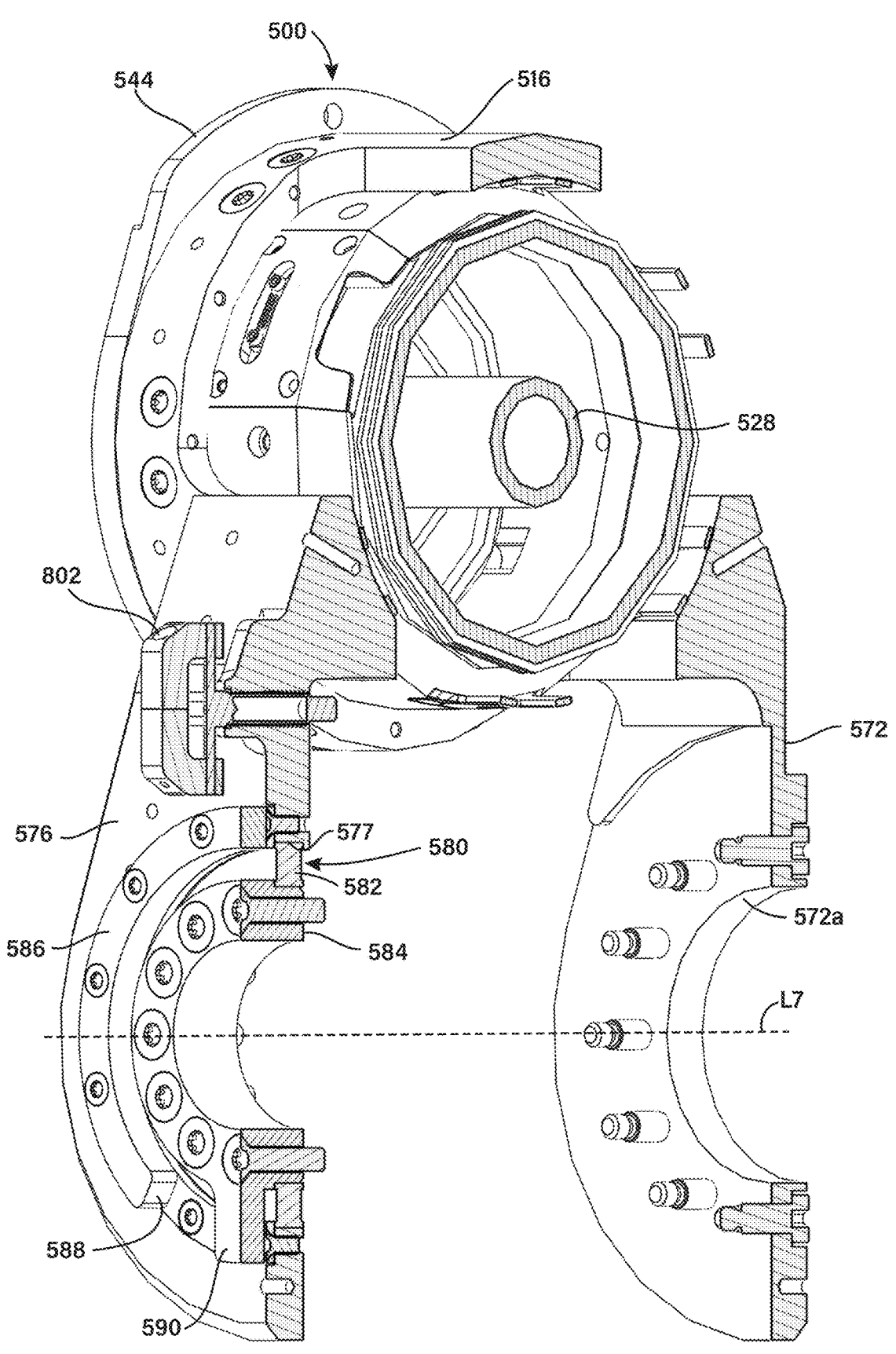
FIG. 5E is a cross-sectional view of the torso segment subassembly of FIG. 5A along line 5E-5E as depicted in FIG. 5D.

As illustrated in FIG. 5E, the actuator connection portion 506 can include two end members 572, 576 disposed on and integrated with opposite sides of the actuator support portion 504 and extending downwardly from the opposite sides of the actuator support portion 504. The end members 572, 576 are spaced apart along the longitudinal axis L7. The end members 572, 576 can have central openings 573, 577 that are axially aligned with the longitudinal axis L7. An actuator can be mounted between the end members 572, 576, and the end members 572, 576 can be rotatably coupled to the actuator shaft of the actuator such that rotation of the actuator shaft about the longitudinal axis L7 results in rotation of the end members 572, 576 about the longitudinal axis L7.

The actuator connection portion 506 can include a bearing subassembly 580 to support rotation of the end member 576 when the end member 576 is coupled to the actuator shaft of an actuator mounted between the end members 572, 576. In one example, the bearing subassembly 580 can include a bearing inner cap 584 disposed within the central opening 577 of the end member 576 and an outer race member 582 disposed about the bearing inner cap 584. The outer race member 582 extends between the bearing inner cap 584 and a wall of the central opening 577. Bearing elements (e.g., ball elements) can be disposed between the bearing inner cap 584 and the outer race member 582. The outer race member 582 can be attached to the end member 576. The bearing inner cap 584 can be coupled to an outer shell of an actuator mounted between the end members 572, 576.

Referring to FIGS. 5D and 5E, the actuator connection portion 506 can include a rotational stop arrangement to limit the rotational range of the bracket 502 about the longitudinal axis L7. In some examples, the rotational stop arrangement can include a rotational stop member 586 attached to the end member 576 and disposed radially of the bearing inner cap 584. The rotational stop member 586 can include a partial circular opening 588 (e.g., the rotational stop member 586 can have horseshoe shape). The bearing inner cap 584 can have a radial tab 590 that extends into the partial circular opening 588. The radial tab 590 can move in a circular path along the partial circular opening 588 in the clockwise or counterclockwise direction until encountering either end wall of the partial circular opening 588.

Figure 5F:
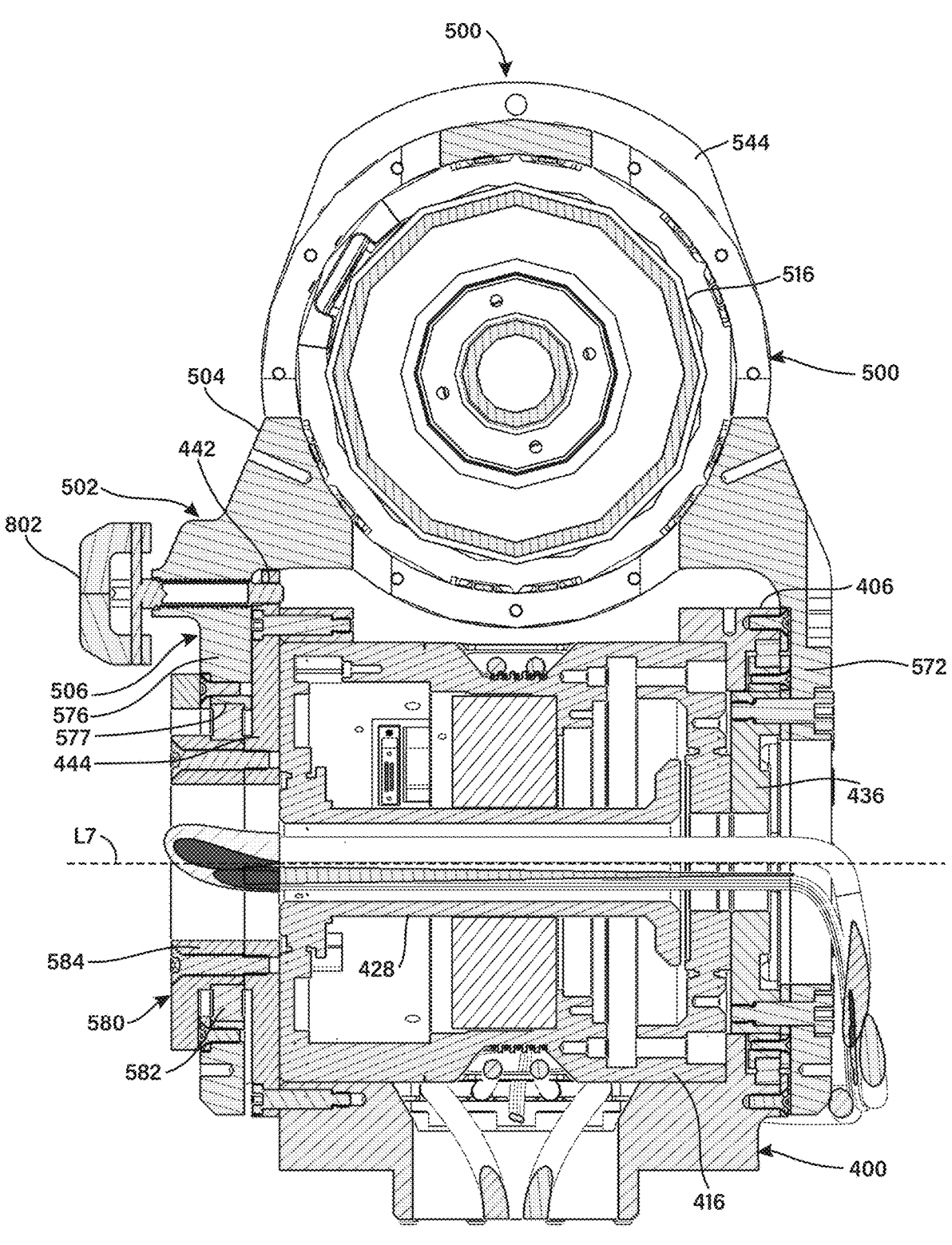
FIG. 5F is a cross-sectional view illustrating coupling of the torso segment subassembly of FIG. 5A to the torso segment subassembly of FIG. 4A.

FIG. 5F shows an example of coupling the torso segment subassembly 500 to the torso segment subassembly 400 in Example V. The actuator support portion 406 of the torso segment subassembly 400, which supports the actuator 416, is disposed between the end members 572, 576 of the actuator connection portion 506 of the torso segment subassembly 500. The bearing inner cap 584 of the bearing assembly 580 mounted within the opening 577 of the end member 576 is attached to the coupling end cap 444 at an end of the actuator support portion 406. The outer race member 582 of the bearing inner cap 584 is between the bearing inner cap 584 and the wall of the opening 577. The end member 572 is attached to the adjacent torque sensor mount 436 of the actuator 416.

Since the torque sensor mount 436 is coupled to the actuator shaft 428 of the actuator 416, rotation of the actuator shaft 428 about the longitudinal axis L7 of the actuator connection portion 506 causes rotation of the torque sensor mount 436 about the longitudinal axis L7, which causes rotation of the end member 572 about the longitudinal axis L7. Since the end member 576 is coupled to the end member 572 through the actuator support portion 504, the end member 576 also rotates about the longitudinal axis L7. The bearing subassembly 580 (e.g., the bearing inner cap 584 and outer race member 582) supports rotation of the end member 572 about the longitudinal axis L7. The rotational range of the end members 572, 576 can be limited by cooperation of the rotational stop members 588, 590 (see FIGS. 5D and 5E; the rotational stop member 588 is coupled to the end member 572, while the rotational stop member 590 is coupled to the bearing inner cap 584, which is coupled to the end cap 444).

In some examples, a lock member 802 (e.g., a spring plunger) can be mounted on the end member 576 and used to lock or unlock the movable joint formed at the actuator 416. In the example, the lock member 802 can extend into an opening 442 in the coupling end cap 444 at the end of the actuator support portion 406 of the torso segment subassembly 400 in order to lock the movable joint formed between the torso segment subassemblies 400, 500 at the actuator 416. When the lock member 802 extends into the opening 442, the end member 576 is fixedly coupled to the coupling end cap 444 and cannot rotate about the longitudinal axis L7 by rotation of the actuator shaft of the actuator 416. To unlock the movable joint formed at actuator 416, the lock member 802 can be retracted from the opening 442. A locking arrangement such as illustrated in FIG. 5F can be used wherever a movable joint is formed in the torso column to prevent accidental bending of the torso column at the movable joint.

Example VII—Example Torso Chassis
Subassembly

FIGS. 6A-6E illustrate an exemplary torso chassis subassembly 600 that can be used in constructing a robotic torso according to Example III). For example, the torso chassis subassembly 600 can provide the torso chassis 224 in FIGS. 2A-2C and include features that can form the movable joint 240.

The torso chassis subassembly 600 can include a bracket 602 having an axial axis L10 that can be aligned with the reference axis of the robotic torso in the neutral position of the robotic torso/torso column. The bracket 602 can include an actuator support 604 with a longitudinal axis L9, which can be orthogonal to the axial axis L10. The actuator support 604 can include two end members 608, 610 spaced apart along the longitudinal axis L9. The end members 608, 610 can have central openings 609, 611 that are axially aligned with the longitudinal axis L8. An actuator can be mounted between the end members 609, 611. The end members 608, 610 can be rotatably coupled to the actuator shaft of the actuator such that rotation of the actuator shaft about the longitudinal axis L9 causes rotation of the end members 608, 610 about the longitudinal axis L9.

The actuator support 604 can include a bearing subassembly 680 to support rotation of the end member 610 when the end member 610 is coupled to the actuator shaft of an actuator mounted between the end members 608, 610. In one example, the bearing subassembly 680 can include a bearing inner cap 684 (shown in FIG. 6B) disposed within the central opening 611 of the end member 610 and an outer race member 682 disposed about the bearing inner cap 684. The outer race member 682 extends between the bearing inner cap 684 and a wall of the central opening 611. Bearing elements (e.g., ball elements) can be disposed between the bearing inner cap 684 and the outer race member 682.

The actuator support 604 can include a rotational stop arrangement to limit the rotational range of the bracket 602 about the longitudinal axis L9. In some examples, the rotational stop arrangement can include a rotational stop member 686 attached to the end member 610 and disposed radially of the bearing inner cap 684. The rotational stop member 686 can be in the form of a partial ring member having a partial circular opening 688. The bearing inner cap 684 can have a radial tab 690 that extends into the partial circular opening 688. The radial tab 690 can move in a circular path along the partial circular opening 688 in the clockwise or counterclockwise direction until encountering either end wall of the partial circular opening 688.

Figure 6A:
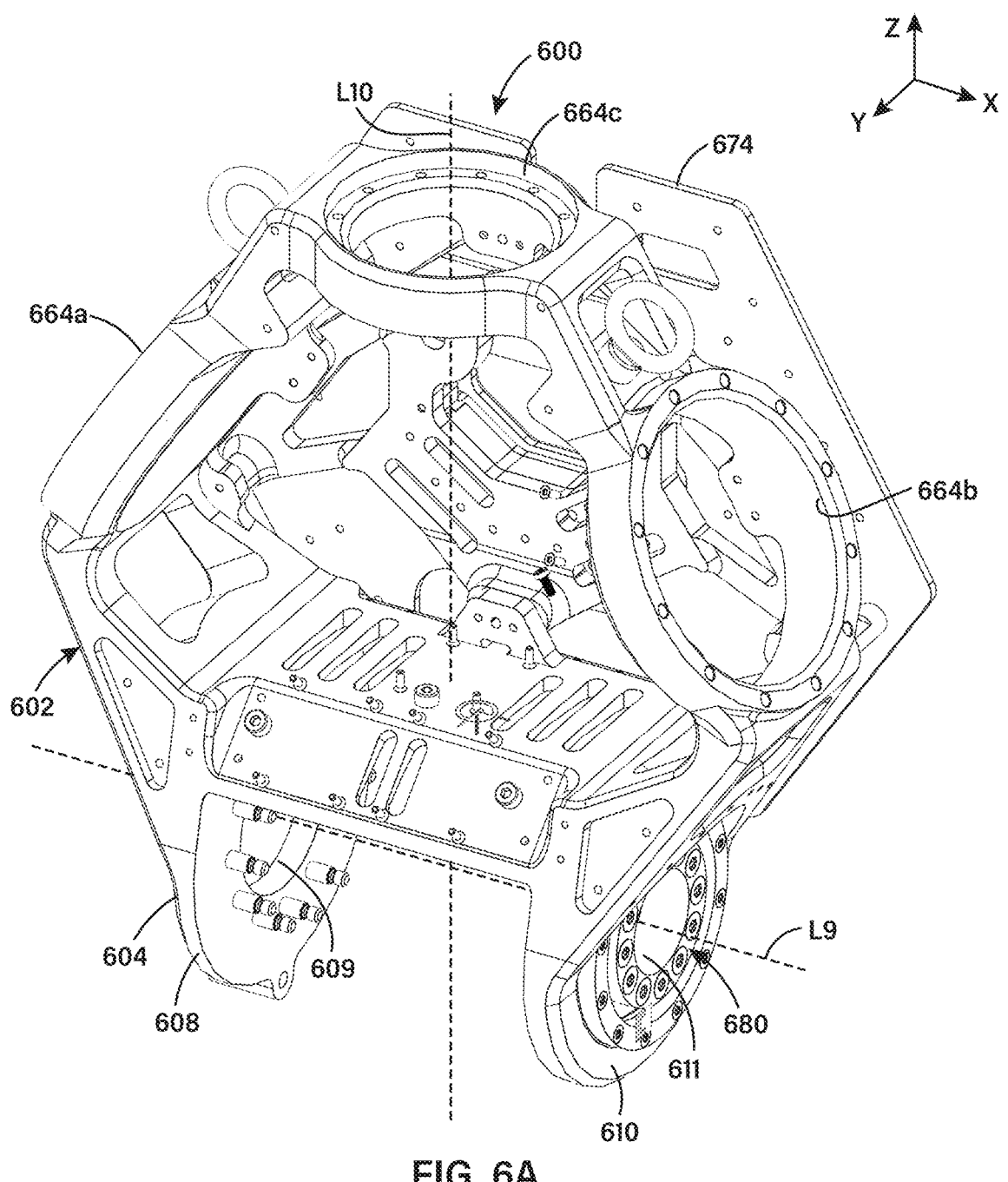
FIG. 6A is a perspective view of an exemplary torso segment subassembly.
Figure 6B:
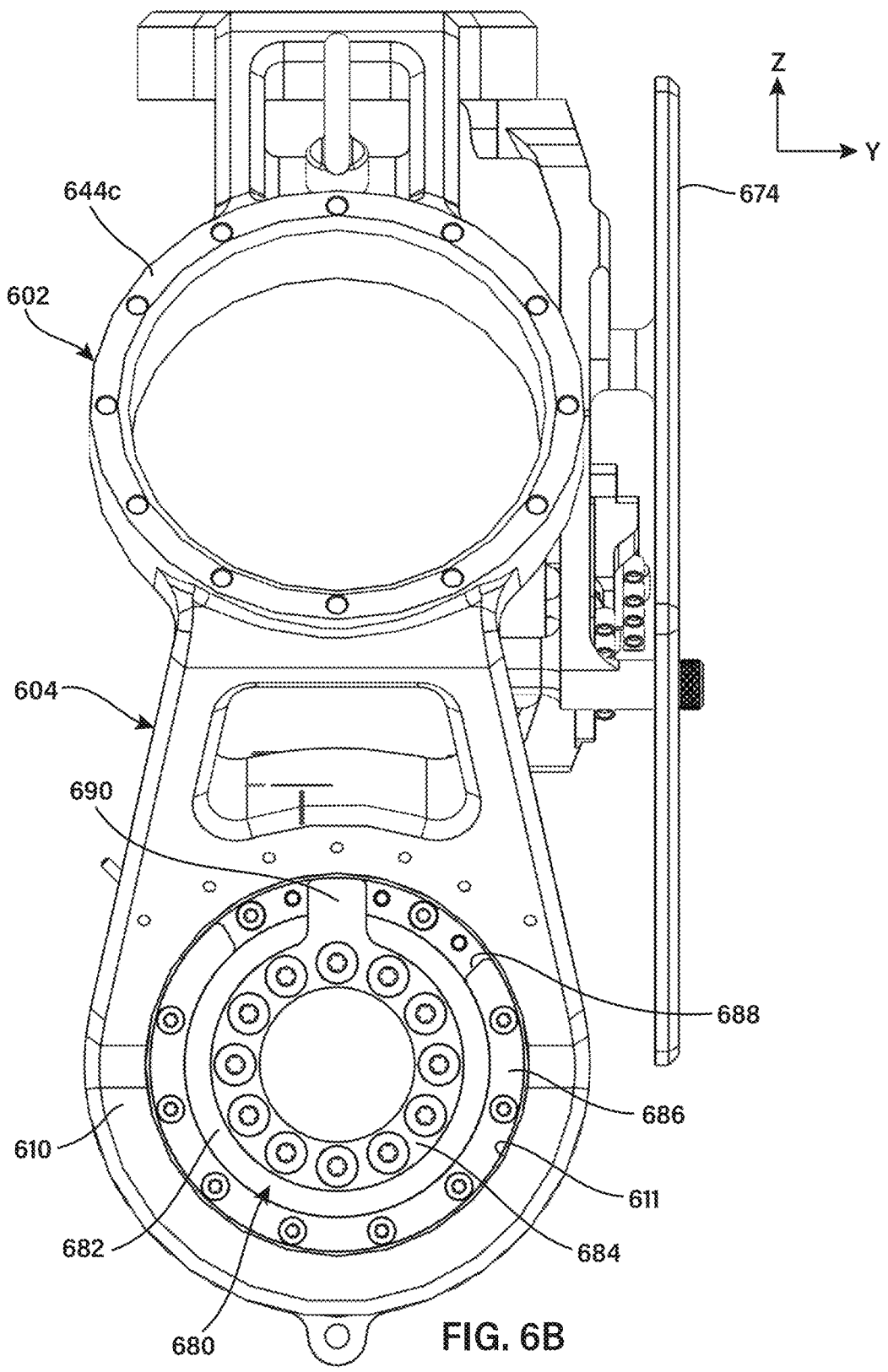
FIG. 6B is a side view of the torso segment subassembly of FIG. 6A.
Figure 6C:
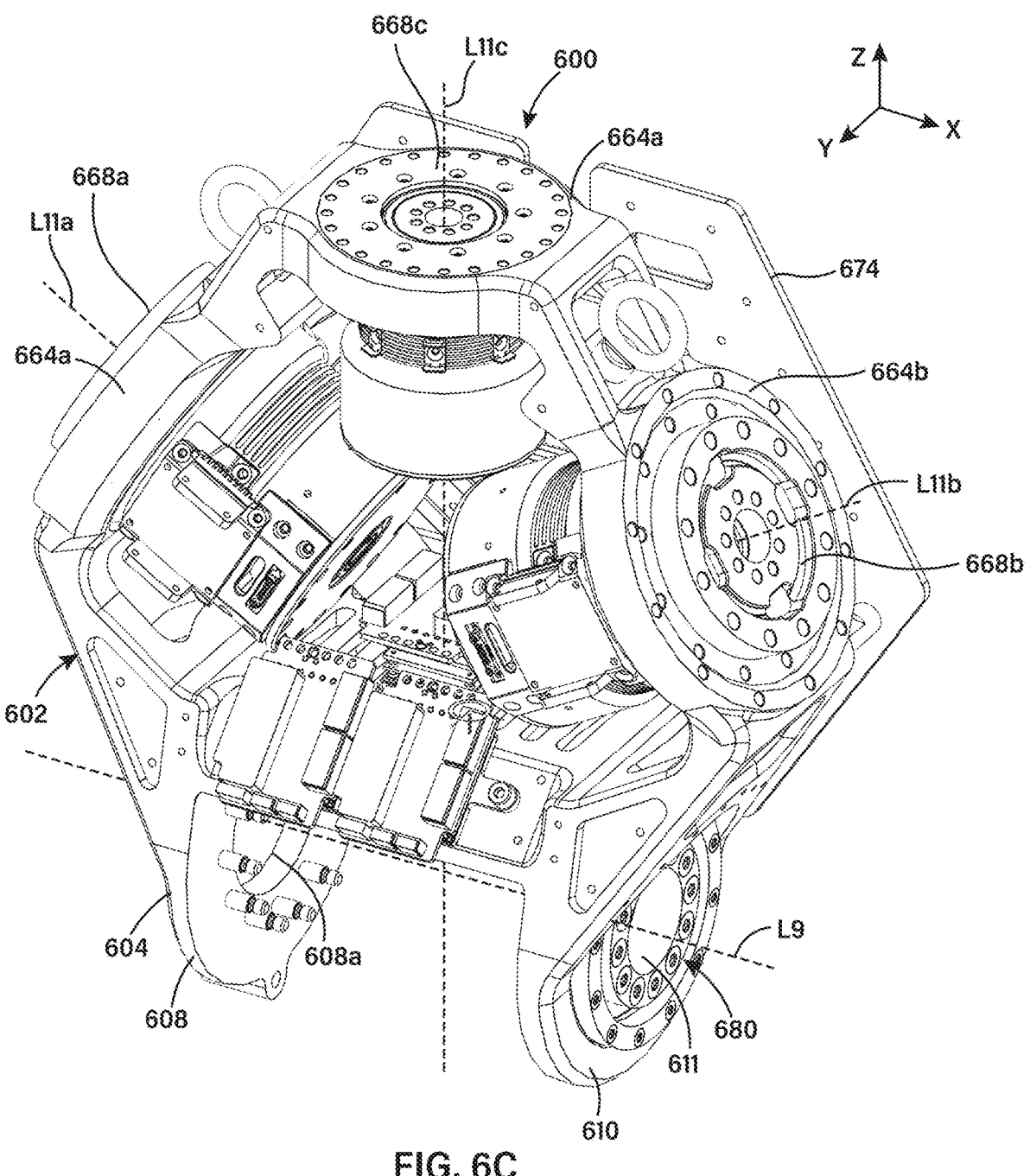
FIG. 6C is a perspective view of the torso segment subassembly with humanoid component joints.

The bracket 602 can include two actuator supports 664a, 664b displaced from the actuator support 604 and on opposite sides of the axial axis L10. In some examples, the actuator supports 664a, 664b can be in the form of ring members. As illustrated in FIGS. 6C and 6F, actuators 668a, 668b can be mounted in the actuator supports 664a, 664b and used to form shoulder joints between robotic arms and the bracket 602. The actuator supports 664a, 664b can be oriented such that the rotational axes L11a, L11b of the actuators 668a, 668b are inclined to the axial axis L10. The bracket 602 can include an actuator support 664c at the top of the bracket 602. The actuator support 664c can be in the form of a ring member. An actuator 668c can be mounted in the actuator support 664c and used to form a neck joint between a robotic head and the bracket 602. The actuator support 664c can be oriented such that the rotational axis L11c of the actuator 668c is aligned with the axial axis L10. In some examples, a backplate 674 can be attached to the back of bracket 602 and can be used for mounting a backpack or other tools. The bracket 602 can include mounting areas for other components (such as drivers for the actuators 668a, 668b, 668c).

Figure 6D:
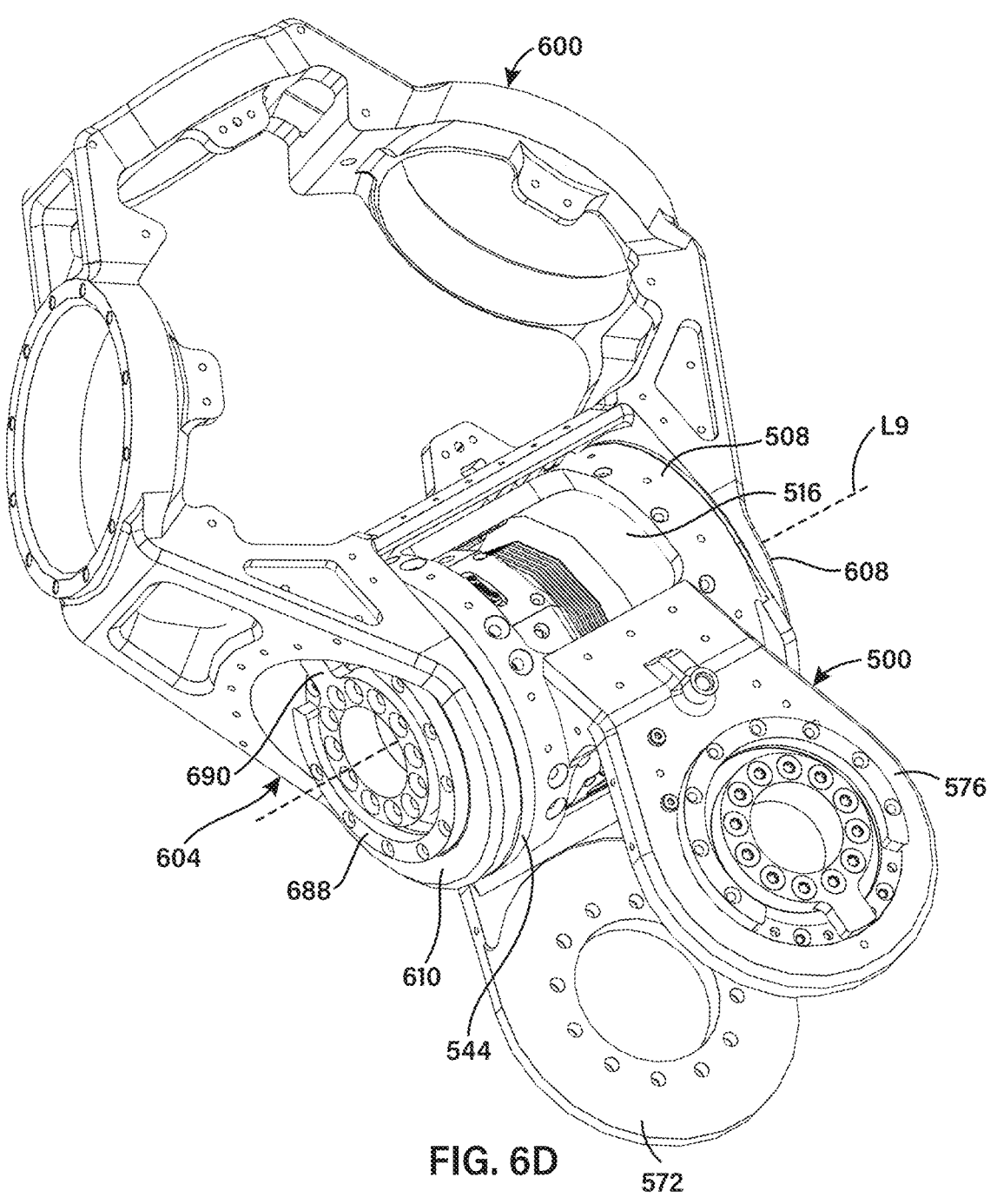
FIG. 6D is a perspective view illustrating coupling of the torso chassis subassembly of FIG. 6A to the torso segment subassembly of FIG. 5A, with humanoid component joints omitted for simplicity of illustration.
Figure 6E:
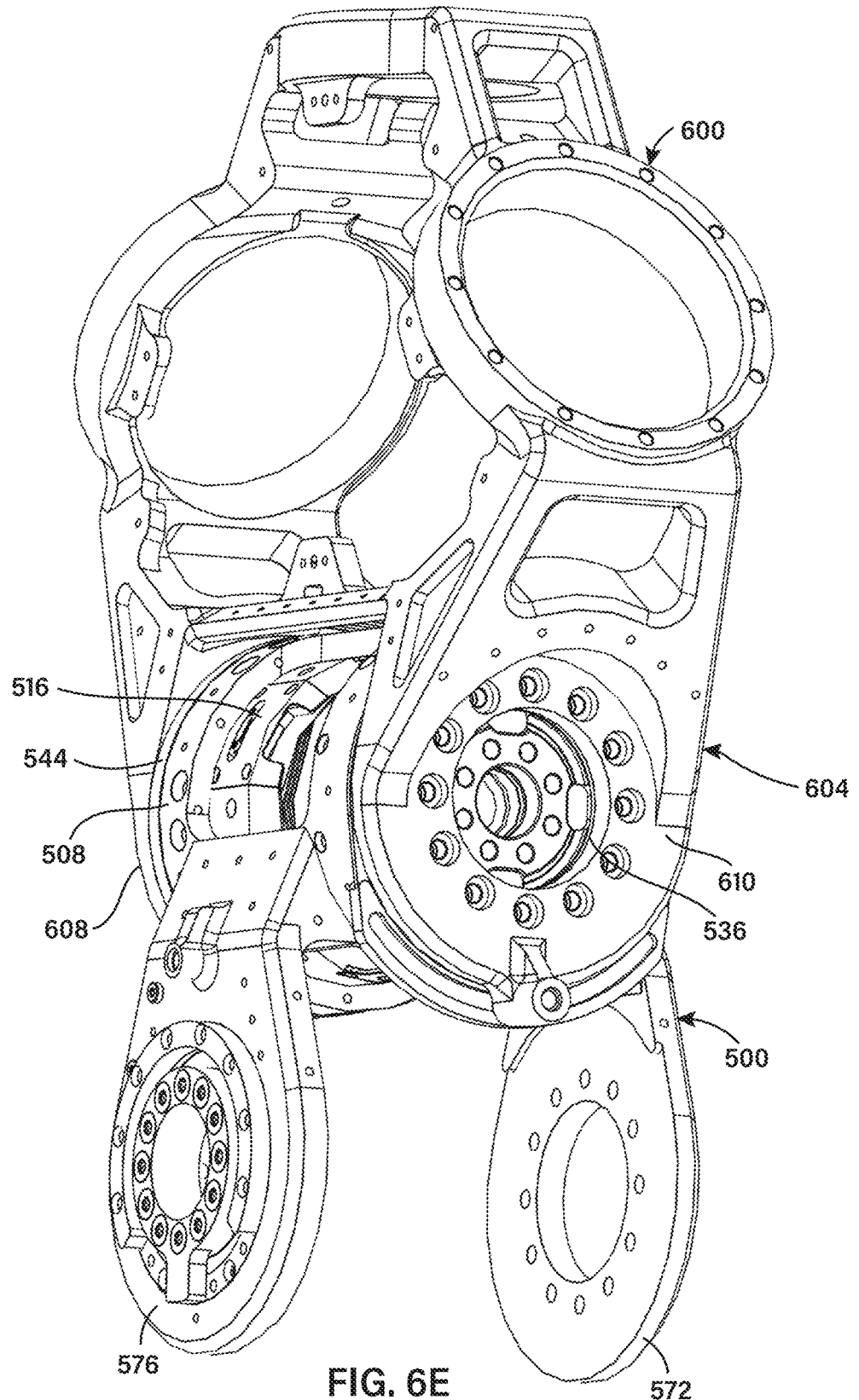
FIG. 6E is a perspective view illustrating coupling of the torso chassis subassembly of FIG. 6A to the torso segment subassembly of FIG. 5A, with humanoid component joints omitted for simplicity of illustration.
Figure 6F:
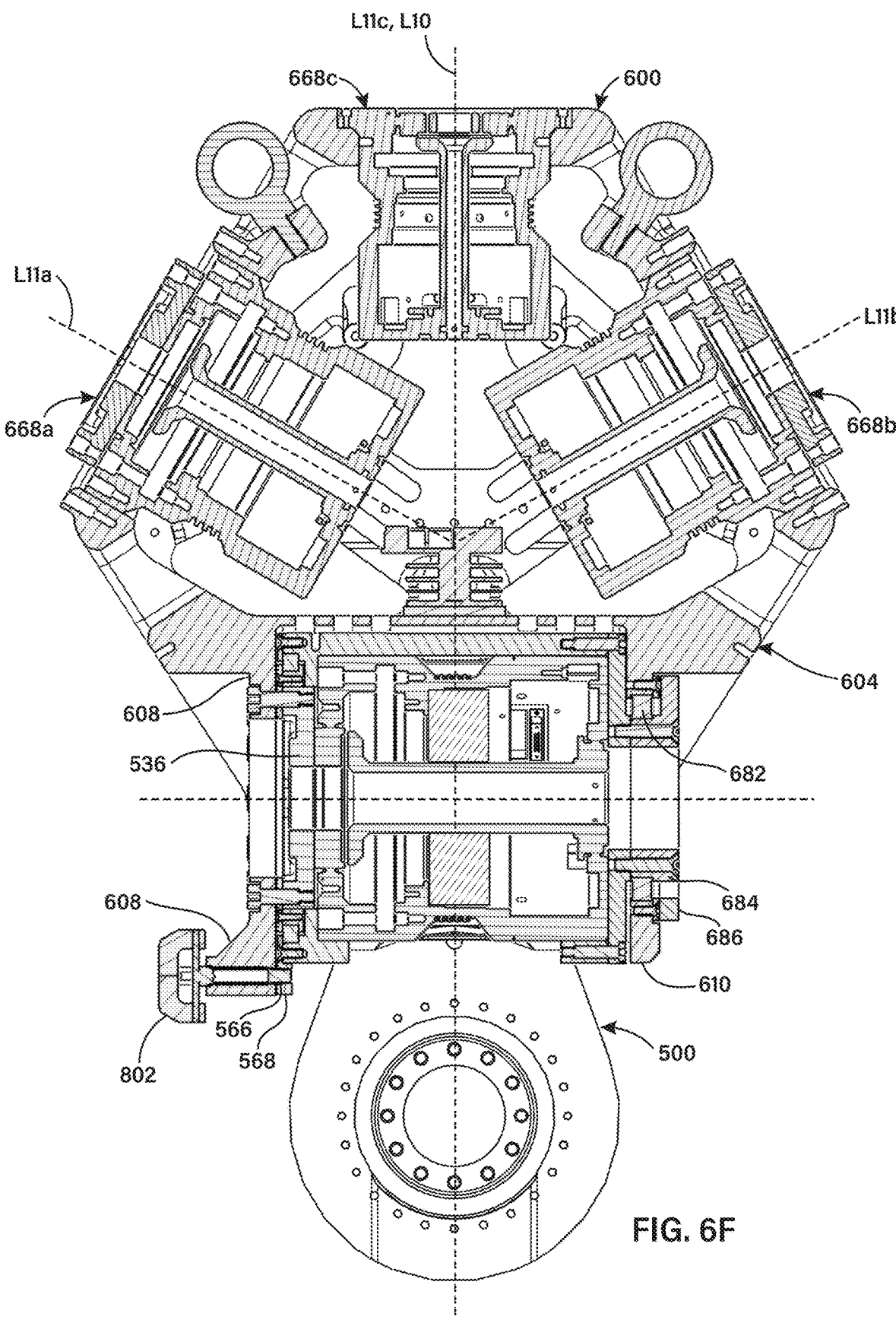
FIG. 6F is a cross-sectional view illustrating coupling of the torso chassis assembly of FIG. 6A to the torso segment subassembly of FIG. 5A.

FIGS. 6D-6E show an example of coupling the torso chassis 600 to a torso segment subassembly 500 (see Example VI). The actuator 516 of the torso segment subassembly 500 is mounted between the flanges 608, 610 of the torso chassis 600. The end member 610 is attached to the coupling end cap 544 at the end of the actuator support 508 of the torso segment subassembly 500. The end member 610 is attached to the torque sensor mount 536 of the actuator

516. Since the torque sensor mount 536 is coupled to the actuator shaft of the actuator 516, rotation of the actuator shaft about the longitudinal axis L9 of the actuator support 604 will result in rotation of the torque sensor mount 536 about the longitudinal axis L9, which will cause rotation of the end member 610 about the longitudinal axis L9. Rotation of the end member 610 will cause rotation of the entire bracket 602, including the end member 608, about the longitudinal axis L9. The rotational range of the end members 508, 510 can be limited by the rotational stop members 688, 690 (see FIG. 6B).

A lock member 802 (e.g., a spring plunger) can be used to lock or unlock the movable joint formed between the torso chassis subassembly 600 and the torso segment subassembly 550 at the actuator 516. For example, the lock member 802 can be mounted on the end member 608. The bearing end cap 568 (see Example VI and FIG. 5C) can include an opening 566 that can be aligned to receive the lock member 802. The lock member 802 can be extended into the opening 566 to lock the movable joint formed at the actuator 516 or retracted from the opening 566 to unlock the movable joint.

Example VIII—Example Method of Subassembly

Figure 7:
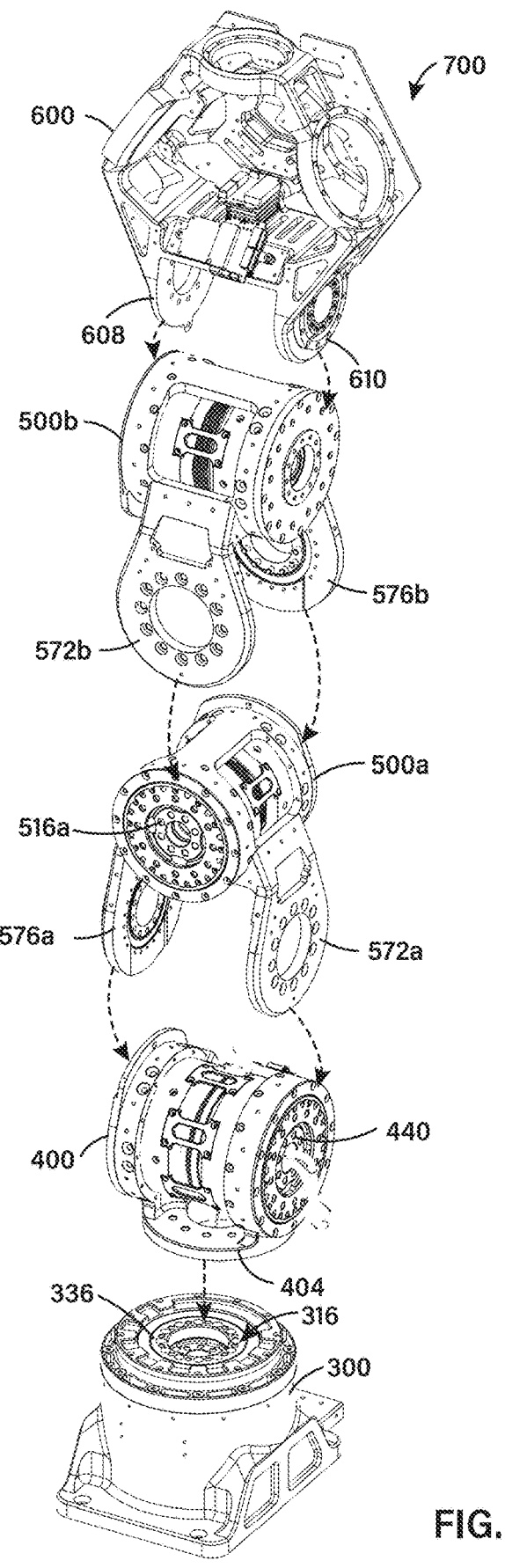
FIG. 7 is an exploded view of a robotic torso formed from the subassemblies depicted in FIGS. 3A-6F.

FIG. 7 illustrates a method 700 of constructing a robot torso according to Example III using a torso base subassembly 300 according to Example IV, a torso segment subassembly 400 according to Example V, two torso segment assemblies 500a, 500b according to Example VI, and a torso chassis assembly 600 according to Example VII.

The method 700 can include coupling the flange 404 of the torso segment subassembly 400 to the torque sensor mount 336 of the actuator 316 of the torso base subassembly 300, as described in Example V, which would form a movable joint between the torso base subassembly 300 and the torso segment subassembly 400 including the actuator 316 (corresponding to the movable joint 244 in FIGS. 2A-2C).

The method 700 can include coupling the flanges 572a, 576a of the first torso segment subassembly 500a to the actuator 416 of the torso segment subassembly 400, as described in Example VI, thereby forming a movable joint between the first torso segment subassembly 500a and the torso segment subassembly 400 including the actuator 416 (corresponding to the movable joint 228 in FIGS. 2A-2C).

The method 700 can include coupling the flanges 572b, 576b of the second torso segment subassembly 500b to the actuator 516a of the first torso segment 500a, as described in Example VI, thereby forming a movable joint between the second torso segment 500a and the first torso segment 500b including the actuator 516a (corresponding to the movable joint 232 in FIG. 2).

The method 700 can include coupling the flanges 610, 612 of the torso segment 600 to the actuator 540b of the second torso segment 500b, as described in Example VII, thereby forming a movable joint between the torso segment 600 and the second torso segment 500b including the actuator 540b (corresponding to the movable joint 240 in FIG. 2).

Example IX—Example Assembled Robotic Torso

Figure 8A:
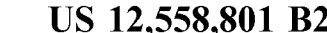
FIG. 8A is a perspective (front) view of an assembled robotic torso formed from the subassemblies depicted in FIGS. 3A-6F.
Figure 8B:
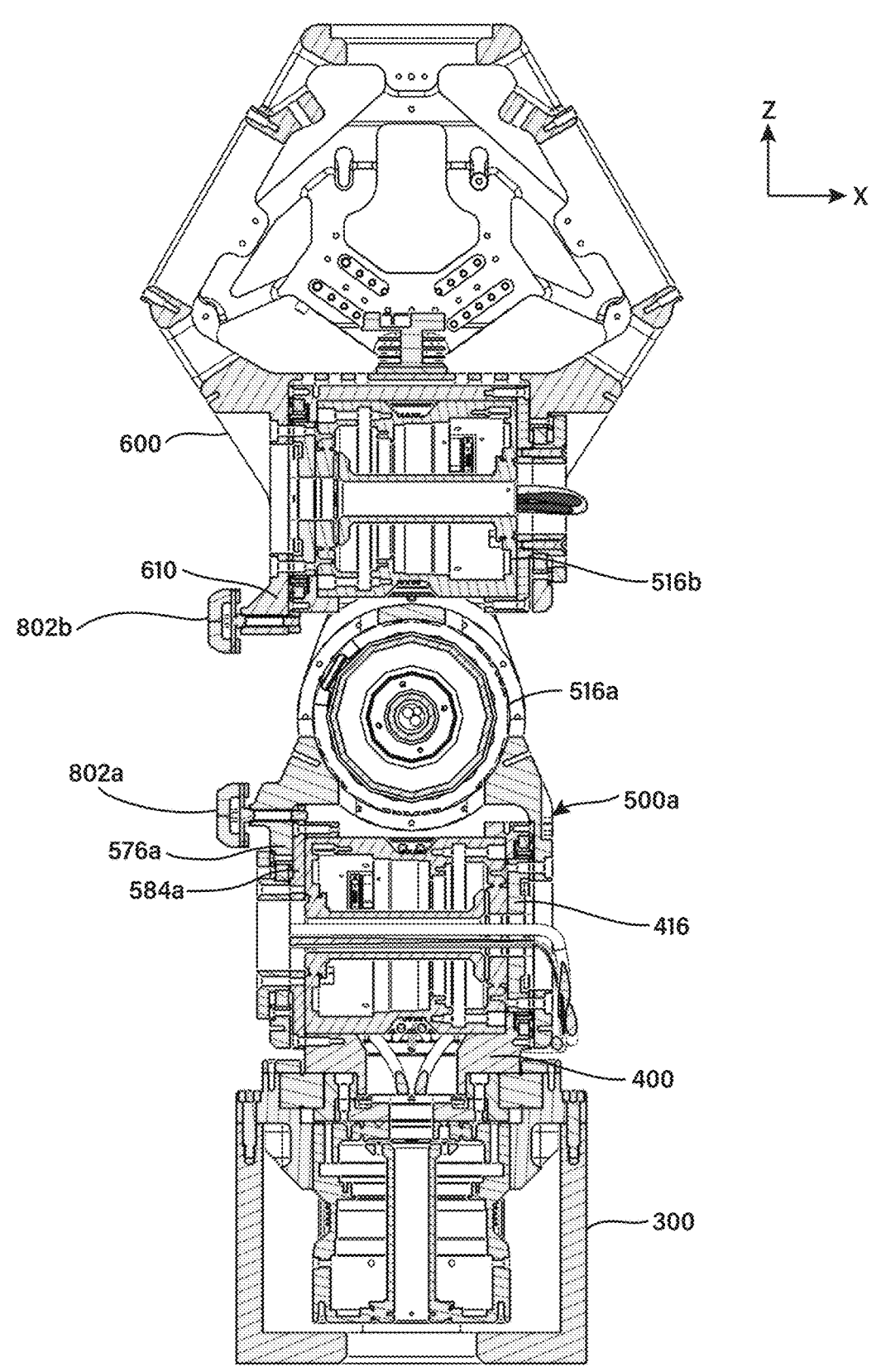
FIG. 8B is a vertical cross-sectional view of the robotic torso of FIG. 8A.
Figure 8C:
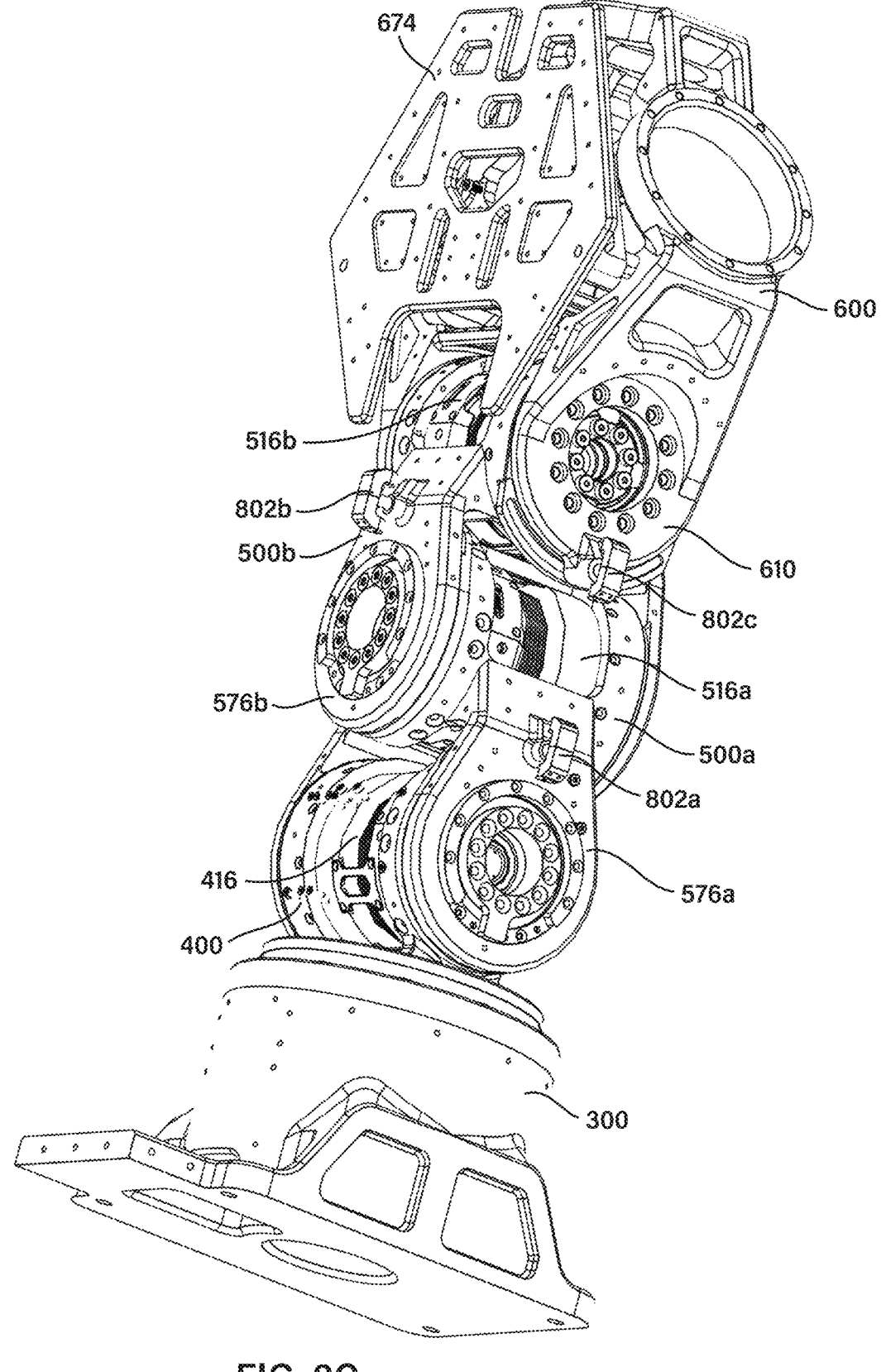
FIG. 8C is a perspective (back) view of the assembled robotic torso of FIG. 8A.

FIGS. 8A-8C illustrate an exemplary robotic torso 800 assembled according to the method in Example VIII. The torso segment subassemblies 400, 500a, 500b, 600 form an articulated torso column 800 that is rotatably coupled to the torso base subassembly 300. The torso column 800 can bend about the X-axis (e.g., flexion/extension) at the joint between the torso segment subassemblies 400, 500*a*, about the Y-axis (e.g., abduction/adduction) at the joint between the torso segment subassemblies 500*a*, 500*b*, and about the X-axis (e.g., flexion/extension) at the joint between the torso segment assemblies 500*b*, 600. Although not shown in FIGS. 8A and 8B, actuators for coupling humanoid components can be coupled to the torso chassis 600 (see FIGS. 6C). The robotic torso 800 can be substituted for the robotic torso 108 illustrated in FIGS. 1A and 1B to form an exemplary humanoid robot.

In some examples, the robotic torso 800 can include locking features to prevent accidental rotation of the torso segments. In some examples, the locking features can include spring plungers. For example, as shown in FIG. 8B, a spring plunger 802*a* can extend through aligned openings in the end member 576*a* and bearing inner cap 584*a* of the torso segment subassembly 500*a* to prevent rotation of the end member 576*a*, which would effectively lock the movable joint formed at the actuator 416 coupled to the end member 576*a*. To unlock the movable joint formed at the actuator 416, the spring plunger 802*a* can be retracted from the hole in the bearing inner cap 584*a*, which would then allow rotation of the end member 576*a*. Spring plungers 802*b*, 802*c* can be similarly provided at the end members 572*b*, 610 coupled to the actuators 516*a*, 516*b*, respectively, as illustrated in FIG. 8C, to allow selective locking/unlocking of these movable joints. In some examples, a lock member (e.g., a spring plunger) can be similarly provided to allow selective locking/unlocking of the movable joint formed between the torso base subassembly 300 and the torso segment subassembly 400.

ADDITIONAL EXAMPLES

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A robotic torso comprising: a torso base having an axial axis aligned with a reference axis; and a torso column coupled to the torso base and rotatable relative to the torso base about the reference axis, the torso column comprising a series of torso segments coupled together by a series of movable joints including at least a first movable joint and a second movable joint, wherein the first movable joint is controllable to bend the torso column about a first axis that is nonparallel to the reference axis, and wherein the second movable joint is controllable to bend the torso column about a second axis that is nonparallel to the reference axis and nonparallel to the first axis.

Example 2: The robotic torso of Example 1, wherein the series of torso segments includes a torso chassis having at least one mounting portion for a humanoid component joint.

Example 3: The robotic torso of Example 1, wherein the series of torso segments includes a torso chassis having a first mounting portion for a first humanoid component joint and a second mounting portion for a second humanoid component joint, and wherein the first mounting portion and the second mounting portion are disposed on opposite sides of the reference axis.

Example 4: The robotic torso of Example 3, further comprising a first robotic arm joint coupled to the first mounting portion and a second robotic arm joint coupled to the second mounting portion.

Example 5: The robotic torso of claim 3, wherein the torso chassis further includes a third mounting portion for a third humanoid component joint, and wherein the third mounting portion is axially aligned with the reference axis.

Example 6: The robotic torso of claim 5, further comprising a robotic neck joint coupled to the third mounting portion.

Example 7: The robotic torso according to any one of Examples 1-6, wherein the torso column has a neutral position in which the torso column is not bent about the first axis or the second axis, wherein the first axis is orthogonal to the reference axis in the neutral position, and wherein the second axis is orthogonal to the first axis and the reference axis in the neutral position.

Example 8: The robotic torso of Example 7, wherein the series of movable joints further includes a third movable joint that is controllable to bend the torso column about a third axis that is nonparallel to the reference axis.

Example 9: The robotic torso of Example 8, wherein the third axis is orthogonal to the reference axis and parallel to the first axis or the second axis in the neutral position.

Example 10: The robotic torso of Example 8, wherein the first movable joint comprises a first rotational joint having a first rotational axis aligned with the first axis, wherein the second movable joint comprises a second rotational joint having a second rotational axis aligned with the second axis, and wherein the third movable joint comprises a third rotational joint having a third rotational axis aligned with the third axis.

Example 11: The robotic torso of Example 10, wherein each of the rotational joints comprises a rotary actuator.

Example 12: The robotic torso of Example 8, wherein the first movable joint is a first flexion-extension joint, wherein the second movable joint is an abduction-adduction joint, and wherein the third movable joint is a second flexion-extension joint.

Example 13: The robotic torso of Example 12, wherein the abduction-adduction joint is at a position in the torso column between a position of the first flexion-extension joint and a position of the second flexion-extension joint.

Example 14: The robotic torso according to any one of Examples 1-13, wherein one of the torso segments in the series of torso segments is coupled to the torso base by a rotational joint having a rotational axis aligned with the reference axis.

Example 15: The robotic torso of Example 1, wherein the series of torso segments includes four torso segments, and wherein the series of movable joints includes three movable joints.

Example 16: A robot comprising: a robotic torso comprising: a torso base having an axial axis aligned with a reference axis; and a torso column coupled to the torso base and rotatable relative to the torso base about the reference axis, the torso column comprising the torso column comprising a series of torso segments coupled together by a series of movable joints including at least a first movable joint and a second movable joint, wherein the first movable joint is controllable to bend the torso column about a first axis that is nonparallel to the reference axis, and wherein the second movable joint is controllable to bend the torso column about a second axis that is nonparallel to the reference axis and nonparallel to the first axis; and a first robotic arm coupled to one of the torso segments of the series of torso segments.

Example 17: The robot of Example 16, wherein the first robotic arm is coupled to the one of the torso segments by a rotational joint.

Example 18: The robot of Example 16, further comprising a second robotic arm coupled to the one of the torso segments.

Example 19: The robot of Example 18, wherein the first robotic arm and the second robotic arm are coupled to the one of the torso segments by rotational joints.

Example 20: The robot of any one of Examples 18-19, wherein the first robotic arm and the second robotic arm are disposed on opposite sides of the reference axis.

Example 21: The robot of any one of Examples 16-19, further comprising a robotic head coupled to the one of the torso segments by a rotational joint having a rotational axis aligned with the reference axis.

Example 22: The robot of any one of Examples 16-21, wherein the torso column has a neutral position in which the torso column is not bent about the first axis or the second axis, wherein the first axis is orthogonal to the reference axis in the neutral position, and wherein the second axis is orthogonal to the first axis and the reference axis in the neutral position.

Example 23: The robot of Example 22, wherein the series of movable joints further includes a third movable joint that is controllable to bend the torso column about a third axis that is nonparallel to the reference axis.

Example 24: The robot of Example 23, wherein the third axis is orthogonal to the reference axis and parallel to the first axis or the second axis in the neutral position.

Example 25: The robot of any one of Examples 23-24, wherein the first movable joint comprises a first rotational joint having a first rotational axis aligned with the first axis, wherein the second movable joint comprises a second rotational joint having a second rotational axis aligned with the second axis, and wherein the third movable joint comprises a third rotational joint having a third rotational axis aligned with the third axis.

Example 26: The robot of Example 25, wherein each of the rotational joints comprises a rotary actuator.

Example 27: The robot of any one of Examples 23-26, wherein the first movable joint is a first flexion-extension joint, wherein the second movable joint is an abduction-adduction joint, and wherein the third movable joint is a second flexion-extension joint.

Example 28: The robot of Example 27, wherein the abduction-adduction joint is at a position in the torso column between a position of the first flexion-extension joint and a position of the second flexion-extension joint.

Example 29: The robot of any one of Examples 16-19, wherein another one of the torso segments is coupled to the torso base by a rotational joint having a rotational axis aligned with the reference axis.

Example 30: The robot of Example 16, wherein the series of torso segments includes four torso segments, and wherein the series of movable joints includes three movable joints.

Example 31: A robotic torso comprising: a torso base having an axial axis aligned with a reference axis; and a torso column coupled to the torso base and rotatable relative to the torso base about the reference axis, the torso column comprising a series of torso segments coupled together by a series of movable joints, wherein each of the movable joints has one or more degrees of freedom and is controllable to define a spatial pose of the torso column in a three-dimensional space; wherein a first pair of the torso segments are coupled together by a first movable joint that is controllable to cause relative rotation between the first pair of torso segments about a first axis that is nonparallel to the reference axis; and wherein a second pair of the torso segments are coupled together by a second movable joint that is controllable to cause relative rotation between the second pair of torso segments about a second axis that is nonparallel to the reference axis and nonparallel to the first axis.

Example 32: The robotic torso of Example 31, wherein a third pair of the torso segments are coupled together by a third movable joint that is controllable to cause relative rotation between the third pair of the torso segments about a third axis that is nonparallel to the reference axis.

Example 33: The robotic torso of Example 32, wherein each of the first movable joint, the second movable joint, and the third movable joint is a rotational joint.

Example 34: The robotic torso of Example 32, wherein the first movable joint includes a first actuator having a first rotational axis aligned with the first axis, wherein the second movable joint includes a second actuator having a second rotational axis aligned with the second axis, and wherein the third movable joint includes a third actuator having a third rotational axis aligned with the third axis.

Example 35: The robotic torso of any one of Examples 32-34, wherein the torso column has a neutral position in which the torso column is not bent about the first axis or the second axis or the third axis, wherein the first axis is orthogonal to the reference axis in the neutral position, wherein the second axis is orthogonal to the first axis and the reference axis in the neutral position, and wherein the third axis is parallel to one of the first axis and the second axis.

Example 36: The robotic torso of Example 35, wherein the second pair of the torso segments is at a position in the torso column between the first pair of the torso segments and the third pair of the torso segments.

Example 37: A robot comprising: a robotic torso comprising: a torso base having an axial axis aligned with a reference axis; and a torso column coupled to the torso base and rotatable relative to the torso base about the reference axis, the torso column comprising a series of torso segments coupled together by a series of movable joints, wherein each of the movable joints has one or more degrees of freedom and is controllable to define a spatial pose of the torso column in a three-dimensional space; wherein a first pair of the torso segments are coupled together by a first movable joint that is controllable to cause relative rotation between the first pair of the torso segments about a first axis that is nonparallel to the reference axis; and wherein a second pair of the torso segments are coupled together by a second movable joint that is controllable to cause relative rotation between the second pair of the torso segments about a second axis that is nonparallel to the reference axis and nonparallel to the first axis; and two robotic arms disposed on opposite sides of the reference axis and coupled to one of the torso segments.

Example 38: The robot of Example 37, wherein each of the two robotic arms is coupled to the one of the torso segments by a rotational joint having a rotational axis inclined to the reference axis.

Example 39: The robot of Example 37, further comprising a robotic head coupled to the one of the torso segments by a rotational joint having a rotational axis aligned with the reference axis.

Example 40: The robot of Example 37, wherein a third pair of torso segments are coupled together by a third movable joint that is controllable to cause relative rotation between the third pair of torso segments about a third axis that is nonparallel to the reference axis.

Example 41: The robot of Example 40, wherein each of the first movable joint, the second movable joint, and the third movable joint is a rotational joint.

Example 42: The robot of Example 40, wherein the first movable joint includes a first actuator having a first rotational axis aligned with the first axis, wherein the second movable joint includes a second actuator having a second rotational axis aligned with the second axis, and wherein the third movable joint includes a third actuator having a third rotational axis aligned with the third axis.

Example 43: A robotic torso comprising: a first torso member having an axial axis aligned with a reference axis; a second torso member having at least one mounting portion for at least one humanoid component joint; and a series of actuators arranged in a column between the first torso member and the second torso member and coupling the first torso member to the second torso member, each of the actuators having a rotatable member defining a rotational axis, wherein the rotational axes of each adjacent pair of the actuators are orthogonal to each other.

Example 44: The robotic torso of Example 43, wherein the first torso member comprises an inner chamber, and wherein a first actuator of the series of actuators is disposed within the inner chamber such that the rotational axis of the first actuator is aligned with the reference axis.

Example 45: The robotic torso of Example 44, further comprising a third torso member coupled to the rotatable member of the first actuator, wherein rotation of the rotatable member of the first actuator about the reference axis causes rotation of the third torso member about the reference axis.

Example 46: The robotic torso of Example 45, further comprising: a first rotational stop member coupled to the first torso member; and a second rotational stop member coupled to the third torso member, wherein the second rotational stop member selectively engages with the first rotational stop member to limit a rotational range of the third torso member about the reference axis.

Example 47: The robotic torso of Example 46, wherein the first rotational stop member comprises a partial circular slot, and wherein the second rotational stop member comprises tab extending into the partial circular slot and movable along the partial circular slot by relative rotation between the third torso member and the first torso member.

Example 48: The robotic torso of Example 44, wherein the third torso member comprises a first actuator support having a first longitudinal axis that is orthogonal to the reference axis, and wherein a second actuator of the series of actuators is mounted on the first actuator support such that the rotational axis of the second actuator is aligned with the first longitudinal axis.

Example 49: The robotic torso of Example 48, further comprising a fourth torso member coupled to the rotatable member of the second actuator, wherein rotation of the rotatable member of the second actuator about the first longitudinal axis causes rotation of the fourth torso member about the first longitudinal axis.

Example 50: The robotic torso of Example 49, further comprising: a first rotational stop member coupled to the fourth torso member; and a second rotational stop member coupled to the rotatable member of the second actuator, wherein the second rotational stop member selectively engages with the first rotational stop member to limit a rotational range of the fourth torso member about the first longitudinal axis.

Example 51: The robotic torso of Example 50, further comprising a locking member coupled to the fourth torso member and movable between a first position to permit rotation of the fourth torso member about the first longitudinal axis and a second position to prevent rotation of the fourth torso member about the first longitudinal axis.

Example 52: The robotic torso of Example 51, wherein the locking member comprises a spring plunger coupled to the fourth torso member and having a plunger movable relative to an opening in the first actuator support.

Example 53: The robotic torso of Example 49, wherein the fourth torso member comprises a second actuator support having a second longitudinal axis that is orthogonal to the first longitudinal axis, and wherein a third actuator of the series of actuators is mounted on the second actuator support such that the rotational axis of the third actuator is aligned with the second longitudinal axis.

Example 54: The robotic torso of Example 53, further comprising a fifth torso member coupled to the rotatable member of the third actuator, wherein rotation of the rotatable member of the third actuator about the second longitudinal axis causes rotation of the fifth torso member about the second longitudinal axis.

Example 55: The robotic torso of Example 54, further comprising: a first rotational stop member coupled to the fifth torso member; and a second rotational stop member coupled to the rotatable member of the fourth torso member, wherein the second rotational stop member selectively engages with the first rotational stop member to limit a rotational range of the fifth torso member about the first axis.

Example 56: The robotic torso of Example 54, further comprising a locking member coupled to the fifth torso member and movable between a first position to engage with the fourth torso member and prevent relative rotation between the fifth torso member and the fourth torso member and a second position to disengage from the fourth member and permit relative rotation between the fifth torso member and the fourth torso member.

Example 57: The robotic torso of Example 53, wherein the fifth torso member comprises a third actuator support having a third longitudinal axis that is orthogonal to the second longitudinal axis, and wherein a fourth actuator of the series of actuators is mounted on the third actuator support such that the rotational axis of the fourth actuator is aligned with the third longitudinal axis.

Example 58: The robotic torso of Example 57, wherein the second torso member is coupled to the rotatable member of the fifth torso member, wherein rotation of the rotatable member of the fifth torso member about the third longitudinal axis causes rotation of the second torso member about the third longitudinal axis.

Example 59: The robotic torso of Example 58, further comprising: a first rotational stop member coupled to the second torso member; and a second rotational stop member coupled to the rotatable member of the fourth actuator, wherein the second rotational stop member selectively engages with the first rotational stop member to limit a rotational range of the second torso member about the third longitudinal axis.

Example 60: The robotic torso of Example 58, further comprising a locking member coupled to the second torso member and movable between a first position to permit relative rotation between the second torso member and the fifth torso member and a second position to prevent relative rotation between the second torso member and the fifth torso member.

Example 61: The robotic torso of any one of Examples 43-60, further comprising a torque sensor coupled to each rotatable member.

Example 62: A robot comprising: a robotic torso comprising: a first torso member having an axial axis aligned with a reference axis; a second torso member having at least one support for at least one humanoid component joint; and a series of actuators arranged in a column between the first torso member and the second torso member and coupling the first torso member to the second torso member, each of the actuators having a rotatable member defining a rotational axis, wherein the rotational axes of each adjacent pair of the actuators are orthogonal to each other; and a humanoid component coupled to the second torso member.

Example 63: The robot of Example 62, wherein the humanoid component is a robotic arm or a robotic head.

Example 64: A robotic torso comprising: a torso base having an inner chamber and an axial axis; a first actuator mounted within the inner chamber, the first actuator comprising a first rotatable member having a first rotational axis aligned with the axial axis; a first torso member having a first support portion and a first connection portion, the first support portion having a first longitudinal axis orthogonal to the axial axis, the first connection portion coupled to the first rotatable member such that the first torso member is rotatable with the first rotatable member; a second actuator mounted on the first support portion, the second actuator comprising a second rotatable member having a second rotational axis aligned with the first longitudinal axis; a second torso member comprising a second support portion having a second longitudinal axis and a second connection portion having a third longitudinal axis orthogonal to the second longitudinal axis, the second connection portion coupled to the second rotatable member such that the second torso member is rotatable with the second rotatable member; and a third actuator mounted on the second support portion, the third actuator comprising a third rotatable member having a third rotational axis aligned with the second longitudinal axis.

Example 65: The robotic torso of Example 64, further comprising a first lock member coupled to the second connection portion and movable between a first position wherein the lock member engages the first connection portion to prevent rotation of the second rotatable member and a second position wherein the first lock member disengages from the first connection portion to permit rotation of the second rotatable member.

Example 66: The robotic torso of Example 64, further comprising a third torso member comprising a third support portion having a fourth longitudinal axis and a third connection portion having a fifth longitudinal axis orthogonal to the fourth longitudinal axis, the third connection portion coupled to the third rotatable member such that the third torso member is rotatable with the third rotatable member.

Example 67: The robotic torso of Example 66, further comprising a second lock member coupled to the third connection portion, wherein the second lock member is movable between a first position wherein the second lock member engages the second connection portion to prevent rotation of the third rotatable member and a second position wherein the second lock member disengages from the second connection portion to permit rotation of the third rotatable member.

Example 68: The robotic torso of Example 66, further comprising a fourth actuator mounted on the third support portion, the fourth actuator comprising a fourth rotatable member having a fourth rotational axis aligned with the fourth longitudinal axis.

Example 69: The robotic torso of Example 68, further comprising a fourth torso member comprising a fourth connection portion having a sixth longitudinal axis, the fourth connection portion coupled to the fourth rotatable member such that the fourth torso member is rotatable with the fourth rotatable member.

Example 70: The robotic torso of Example 69, further comprising a third lock member coupled to the fourth connection portion, wherein the third lock member is movable between a first position wherein the third lock member engages the third connection portion to prevent rotation of the fourth rotatable member and a second position wherein the third lock member disengages from the third connection portion to permit rotation of the fourth rotatable member.

Example 71: The robotic torso of Example 69, wherein the fourth torso member comprises a first mounting portion for a first humanoid component and a second mounting portion for a second humanoid component, and wherein the first mounting portion and the second mounting portion are disposed on opposite sides of an axial axis of the fourth torso member.

Example 72: The robotic torso of Example 71, wherein the fourth torso member comprises a third mounting portion for a third humanoid component, and wherein an axial axis of the third mounting portion is aligned with the axial axis of the fourth torso member.

Example 73: The robotic torso of Example 72, wherein the fourth torso member comprises a fourth mounting portion for a non-humanoid component.

Example 74: The robotic torso of Example 64, further comprising a first bearing member disposed between a first end portion of the first rotatable member and the torso base.

Example 75: The robotic torso of Example 74, further comprising: an annular bracket attached to the torso base and disposed circumferentially around the first end portion of the first rotatable member; wherein the first bearing member is disposed between the annular bracket and the first end portion of the first rotatable member.

Example 76: The robotic torso of Example 75, wherein the first rotatable member comprises a first actuator shaft, wherein the first end portion of the first rotatable member comprises a first torque sensor mount coupled to the first actuator shaft and a first torque sensor attached to the first torque sensor mount, and wherein the first bearing member is disposed between the annular bracket and the first torque sensor mount.

Example 77: The robotic torso of Example 75, wherein the annular bracket comprises a tapered portion extending into an annular space between the torso base and the first actuator and engaging an outer surface of the first actuator.

Example 78: The robotic torso of Example 74, wherein the first connection portion comprises a flange, and wherein the annular bracket is disposed circumferentially around the flange.

Example 79: The robotic torso of Example 78, further comprising: a first rotational stop member coupled to the annular bracket and disposed radially outward of the flange; and a second rotational stop member coupled to the flange; wherein the second rotational stop member and the first rotational stop member selectively engage each other to limit a rotational range of the first torso member about the first rotational axis.

Example 80: The robotic torso of Example 79, wherein the second rotational stop member comprises a partial circular slot, wherein the first rotational stop member comprises a tab, and wherein the tab extends radially into the partial circular slot and selectively engages a wall of the partial circular slot to limit the rotational range of the first torso member.

Example 81: The robotic torso of Example 74, wherein the first support portion comprises a first end member and a second end member spaced apart along the first longitudinal axis, wherein the first end member comprises a first opening receiving a first end portion of the second actuator, and wherein the second end member comprises a second opening receiving a second end portion of the second actuator.

Example 82: The robotic torso of Example 81, further comprising a second bearing member disposed between a first end portion of the second rotatable member and the first end member.

Example 83: The robotic torso of Example 82, wherein the second rotatable member comprises a second actuator shaft, wherein the first end portion of the second rotatable member comprises a second torque sensor mount coupled to the second actuator shaft and a second torque sensor attached to the second torque sensor mount, and wherein the second bearing member is disposed between the first end member and the second torque sensor mount.

Example 84: The robotic torso of Example 82, wherein the second connection portion comprises a third end member and a fourth end member spaced apart along the third longitudinal axis, wherein the first end member and the second end member are mounted between the third end member and the fourth end member, and wherein the third end member is coupled to the first end portion of the second rotatable member.

Example 85: The robotic torso of Example 84, wherein the third end member and the fourth end member are coupled together such that rotation of the third end member causes rotation of the fourth end member, and further comprising a third bearing member disposed between the second actuator and the fourth end member.

Example 86: The robotic torso of Example 85, wherein the third bearing member comprises: an inner bearing member coupled to an outer shell of the second actuator; and an outer bearing member disposed between the inner bearing member and the fourth end member.

Example 87: A robot comprising: a robotic torso according to any one of Examples 64-86 and at least one humanoid component coupled to the robotic torso.

The invention claimed is:

1. A robotic torso comprising:
a first torso member having an axial axis aligned with a reference axis, wherein the first torso member comprises an inner chamber;
a second torso member having at least one mounting portion for at least one humanoid component joint;
a series of actuators arranged in a column between the first torso member and the second torso member and coupling the first torso member to the second torso member, each of the actuators having a rotatable member defining a rotational axis, wherein the rotational axes of each adjacent pair of the actuators are orthogonal to each other, wherein a first actuator of the series of actuators is disposed within the inner chamber such that the rotational axis of the first actuator is aligned with the reference axis;
a third torso member coupled to the rotatable member of the first actuator, wherein rotation of the rotatable member of the first actuator about the reference axis causes rotation of the third torso member about the reference axis;
a first rotational stop member coupled to the first torso member; and
a second rotational stop member coupled to the third torso member, wherein the second rotational stop member selectively engages with the first rotational stop member to limit a rotational range of the third torso member about the reference axis.

2. The robotic torso of claim 1, wherein the third torso member comprises a first actuator support having a first longitudinal axis that is orthogonal to the reference axis, and wherein a second actuator of the series of actuators is mounted on the first actuator support such that the rotational axis of the second actuator is aligned with the first longitudinal axis; and further comprising:
a fourth torso member coupled to the rotatable member of the second actuator, wherein rotation of the rotatable member of the second actuator about the first longitudinal axis causes rotation of the fourth torso member about the first longitudinal axis.

3. The robotic torso of claim 2, further comprising:
a third rotational stop member coupled to the fourth torso member;
a fourth rotational stop member coupled to the rotatable member of the second actuator, wherein the fourth rotational stop member selectively engages with the third rotational stop member to limit a rotational range of the fourth torso member about the first longitudinal axis; and
a locking member coupled to the fourth torso member and movable between a first position to permit rotation of the fourth torso member about the first longitudinal axis and a second position to prevent rotation of the fourth torso member about the first longitudinal axis.

4. The robotic torso of claim 2, wherein the fourth torso member comprises a second actuator support having a second longitudinal axis that is orthogonal to the first longitudinal axis, and wherein a third actuator of the series of actuators is mounted on the second actuator support such that the rotational axis of the third actuator is aligned with the second longitudinal axis; and further comprising:
a fifth torso member coupled to the rotatable member of the third actuator, wherein rotation of the rotatable member of the third actuator about the second longitudinal axis causes rotation of the fifth torso member about the second longitudinal axis.

5. The robotic torso of claim 4, further comprising:
a third rotational stop member coupled to the fifth torso member;
a fourth rotational stop member coupled to the rotatable member of the fourth torso member, wherein the fourth rotational stop member selectively engages with the third rotational stop member to limit a rotational range of the fifth torso member about the first axis; and
a locking member coupled to the fifth torso member and movable between a first position to engage with the fourth torso member and prevent relative rotation between the fifth torso member and the fourth torso member and a second position to disengage from the fourth member and permit relative rotation between the fifth torso member and the fourth torso member.

6. The robotic torso of claim 4, wherein the fifth torso member comprises a third actuator support having a third longitudinal axis that is orthogonal to the second longitudinal axis, wherein a fourth actuator of the series of actuators is mounted on the third actuator support such that the rotational axis of the fourth actuator is aligned with the third longitudinal axis, wherein the second torso member is coupled to the rotatable member of the fifth torso member, and wherein rotation of the rotatable member of the fifth torso member about the third longitudinal axis causes rotation of the second torso member about the third longitudinal axis.

7. The robotic torso of claim 6, further comprising:

a third rotational stop member coupled to the second torso member;

a fourth rotational stop member coupled to the rotatable member of the fourth actuator, wherein the fourth rotational stop member selectively engages with the third rotational stop member to limit a rotational range of the second torso member about the third longitudinal axis; and a locking member coupled to the second torso member and movable between a first position to permit relative rotation between the second torso member and the fifth torso member and a second position to prevent relative rotation between the second torso member and the fifth torso member.

8. A robot comprising:

a robotic torso comprising:

a first torso member having an axial axis aligned with a reference axis, wherein the first torso member comprises an inner chamber;

a second torso member having at least one mounting portion for at least one humanoid component joint;

a series of actuators arranged in a column between the first torso member and the second torso member and coupling the first torso member to the second torso member, each of the actuators having a rotatable member defining a rotational axis, wherein the rotational axes of each adjacent pair of the actuators are orthogonal to each other, wherein a first actuator of the series of actuators is disposed within the inner chamber such that the rotational axis of the first actuator is aligned with the reference axis;

a third torso member coupled to the rotatable member of the first actuator, wherein rotation of the rotatable member of the first actuator about the reference axis causes rotation of the third torso member about the reference axis;

a first rotational stop member coupled to the first torso member; and a second rotational stop member coupled to the third torso member, wherein the second rotational stop member selectively engages with the first rotational stop member to limit a rotational range of the third torso member about the reference axis; and two robotic arms disposed on opposite sides of the reference axis, each robotic arm coupled to one of the torso members.

* * * * *